(12) United States Patent
Colenbrander

(10) Patent No.: US 11,311,801 B2
(45) Date of Patent: Apr. 26, 2022

(54) METHODS FOR USING HIGH-SPEED DATA COMMUNICATION FABRIC TO ENABLE CROSS-SYSTEM COMMAND BUFFER READING FOR DATA RETRIEVAL IN CLOUD GAMING

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 238 days.

(21) Appl. No.: 16/556,059

(22) Filed: Aug. 29, 2019

(65) Prior Publication Data

US 2021/0042059 A1 Feb. 11, 2021

Related U.S. Application Data

(60) Provisional application No. 62/885,184, filed on Aug. 9, 2019.

(51) Int. Cl.
*G06F 3/06* (2006.01)
*A63F 13/355* (2014.01)
(Continued)

(52) U.S. Cl.
CPC .......... *A63F 13/355* (2014.09); *A63F 13/352* (2014.09); *A63F 13/77* (2014.09); *G06F 3/061* (2013.01); *G06F 3/067* (2013.01); *G06F 3/0656* (2013.01); *G06F 3/0659* (2013.01); *G06F 9/3877* (2013.01); *G06F 13/122* (2013.01); *G06F 13/16* (2013.01);
(Continued)

(58) Field of Classification Search
CPC ....... G06F 3/067; G06F 3/0656; G06F 3/0659
See application file for complete search history.

(56) References Cited

U.S. PATENT DOCUMENTS 9,804,988 B1 10/2017 Ayoub et al.
9,940,123 B1 4/2018 Ayoub et al.
(Continued)

OTHER PUBLICATIONS

PCT/US2020/043145, International Search Report and Written Opinion, dated Nov. 3, 2020.

*Primary Examiner* — Zachary K Huson
(74) *Attorney, Agent, or Firm* — Penilla IP, APC

(57) ABSTRACT

A cloud gaming system includes a storage system and a compute system connected through a PCIe fabric. The compute system generates a command buffer for a read operation, writes the command buffer to compute system memory, and notifies the storage system about the command buffer. The storage system reads the command buffer in the compute system memory and processes the command buffer to read requested data. In one embodiment, the storage system writes the requested data in the compute system memory and notifies the compute system about the requested data in the compute system memory, and the compute system reads the requested data from its memory. In another embodiment, the storage system writes the requested data in the storage system memory and notifies the compute system about the requested data in the storage system memory, and the compute system reads the requested data from the storage system memory.

23 Claims, 16 Drawing Sheets

(51) Int. Cl.
  *A63F 13/352* (2014.01)
  *G06F 13/40* (2006.01)
  *G06F 13/12* (2006.01)
  *A63F 13/77* (2014.01)
  *G06F 13/16* (2006.01)
  *G06F 13/24* (2006.01)
  *G06F 13/42* (2006.01)
  *G06F 9/38* (2018.01)

(52) U.S. Cl.
  CPC .......... *G06F 13/1673* (2013.01); *G06F 13/24* (2013.01); *G06F 13/4022* (2013.01); *G06F 13/4059* (2013.01); *G06F 13/4221* (2013.01); *G06F 3/0607* (2013.01); *G06F 2213/0026* (2013.01)

(56) References Cited

U.S. PATENT DOCUMENTS

| | | |
|---|---|---|
| 10,162,793 B1 | 12/2018 | Bshara et al. |
| 10,241,951 B1 | 3/2019 | Ayoub et al. |
| 10,282,192 B1 | 5/2019 | Ayoub et al. |
| 2013/0086336 A1* | 4/2013 | Canepa ................ G06F 3/0688 711/154 |
| 2016/0321200 A1 | 11/2016 | Long et al. |
| 2018/0018123 A1 | 1/2018 | Shah et al. |
| 2018/0314654 A1 | 11/2018 | Long et al. |
| 2018/0349165 A1 | 12/2018 | Asaro et al. |
| 2019/0166201 A1 | 5/2019 | Choi et al. |
| 2019/0227729 A1 | 7/2019 | Shah et al. |

* cited by examiner

| File ID | Offset | Size | Other Metadata |
|---------|------------|---------|----------------|
| 0 | 0x00001000 | 64 KiB | |
| 1 | 0x00009000 | 1 MiB | |
| ⋮ | ⋮ | ⋮ | ⋮ |
| N | 0xFF000000 | 128 KiB | |

Having a cloud gaming system including a cloud storage system having a PCIe interface, where the cloud storage system includes a RAM, and where the cloud gaming system includes a PCIe switch connected to the PCIe interface of the cloud storage system, and where the cloud gaming system includes a cloud compute system having a PCIe interface connected to the PCIe switch, and where the PCIe switch exposes one or more doorbell registers.

1503

Operating the cloud compute system to write to the doorbell register.

1505

In response to writing to the doorbell register, firing an interrupt on the cloud storage system.

1507

Operating the cloud storage system to handle the interrupt, where the interrupt directs the cloud storage system to read a message from a specified location in the RAM of the cloud storage system, where the message directs the cloud storage system to read requested data from a storage device accessible by the cloud storage system.

Fig. 15

METHODS FOR USING HIGH-SPEED DATA COMMUNICATION FABRIC TO ENABLE CROSS-SYSTEM COMMAND BUFFER READING FOR DATA RETRIEVAL IN CLOUD GAMING

CLAIM OF PRIORITY

This application claims priority under 35 U.S.C. 119(e) to U.S. Provisional Patent Application No. 62/885,184, filed Aug. 9, 2019, the disclosure of which is incorporated herein by reference in its entirety for all purposes.

BACKGROUND

The video game industry has seen many changes over the years. As computing power has expanded, developers of video games have likewise created game software that takes advantage of the growing computing power. To this end, video game developers have been coding games that incorporate sophisticated operations and mathematics to produce a very realistic game experience.

In addition to accommodating for the expanding computing power, the game developers are also developing online games that increase the interaction between user and the gaming system. The interactive online games provide the ability for a user to interactively play against or with other users over the Internet and capture such interactions. Additionally, with the growing trend in cloud-based computing, the game developers are developing new ways for playing existing legacy games and for developing new games by taking advantage of the increased computing power and increased user interactivity. The cloud-based computing systems may include a cloud-based processing server that executes a game application, and communicates with a remote client system that is present at a location of a game player, where the remote client system can be configured to receive input from game player and render video on a display for viewing by the game player. It is within this context that the present invention arises.

SUMMARY

In an example embodiment, a cloud gaming system is disclosed. The cloud gaming system includes a cloud storage system having a peripheral component interconnect express (PCIe) interface. The cloud storage system also includes a computer memory. The cloud gaming system includes a PCIe switch connected to the PCIe interface of the cloud storage system. The cloud gaming system includes a cloud compute system having a PCIe interface connected to the PCIe switch. The cloud compute system has a client memory map that holds memory addresses assigned to components of the cloud compute system. The PCIe switch is configured to translate the memory addresses held in the client memory map to memory addresses in the computer memory of the cloud storage system, such that access to a given memory address in the client memory map is translated by the PCIe switch to instead access a given memory address in the computer memory of the cloud storage system.

In an example embodiment, a cloud gaming system is disclosed. The cloud gaming system includes a cloud storage system having a PCIe interface. The cloud storage system includes a computer memory. The cloud gaming system includes a first PCIe switch connected to the PCIe interface of the cloud storage system. The cloud gaming system includes a second PCIe switch connected the first PCIe switch. The cloud gaming system includes a third PCIe switch connected to the first PCIe switch. The cloud gaming system includes a first cloud compute system having a PCIe interface connected to the second PCIe switch. The first cloud compute system has a first client memory map that holds memory addresses assigned to components of the first cloud compute system. One or both of the first and second PCIe switches are configured to translate the memory addresses held in the first client memory map to memory addresses in the computer memory of the cloud storage system, such that access to a given memory address in the first client memory map is translated to instead access a given memory address in the computer memory of the cloud storage system. The cloud gaming system includes a second cloud compute system having a PCIe interface connected to the third PCIe switch. The second cloud compute system has a second client memory map that holds memory addresses assigned to components of the second cloud compute system. One or both of the first and third PCIe switches are configured to translate the memory addresses held in the second client memory map to memory addresses in the computer memory of the cloud storage system, such that access to a given memory address in the second client memory map is translated to instead access a given memory address in the computer memory of the cloud storage system.

In an example embodiment, a method is disclosed for requesting data in a cloud gaming system. The method includes having a cloud gaming system that includes a cloud storage system having a PCIe interface. The cloud storage system includes a computer memory. The cloud gaming system also includes a PCIe switch connected to the PCIe interface of the cloud storage system. The cloud gaming system also includes a cloud compute system having a PCIe interface connected to the PCIe switch. The cloud compute system includes a computer memory. The PCIe switch exposes a doorbell register that is monitored by the cloud storage system. The method also includes operating the cloud compute system to write to the doorbell register, where writing to the doorbell register causes an interrupt to fire on the cloud storage system. The method also includes operating the cloud storage system to handle the interrupt. The interrupt directs the cloud storage system to read a message from a specified location in the computer memory of the cloud storage system. The message directs the cloud storage system to read requested data from a storage device accessible by the cloud storage system.

In an example embodiment, a method is disclosed for requesting and transferring data in a cloud gaming system. The method includes having a cloud gaming system that includes a cloud storage system and a cloud compute system connected to each other through a PCIe fabric. The cloud storage system includes a computer memory. The cloud compute system includes a computer memory. The method also includes operating the cloud compute system to generate a command buffer for a data read operation. The method also includes operating the cloud compute system to write the command buffer through the PCIe fabric to the computer memory of the cloud storage system. The method also includes operating the cloud compute system to notify the cloud storage system through the PCIe fabric that the command buffer has been written to the computer memory of the cloud storage system. The method also includes operating the cloud storage system to read the command buffer from the computer memory of the cloud storage system. The method also includes operating the cloud storage system to process the command buffer to read requested data from a storage device accessible by cloud storage system and write the requested data in the computer memory of the cloud storage system. The method also includes operating the cloud storage system to notify the cloud compute system through the PCIe fabric that the requested data is in the computer memory of the cloud storage system. The method also includes operating the cloud compute system to read the requested data through the PCIe fabric from the computer memory of the cloud storage system.

In an example embodiment, a method is disclosed for requesting and transferring data in a cloud gaming system. The method includes having a cloud gaming system that includes a cloud storage system and a cloud compute system connected to each other through a PCIe fabric. The cloud storage system includes a computer memory. The cloud compute system includes a computer memory. The method also includes operating the cloud compute system to generate a command buffer for a data read operation. The method also includes operating the cloud compute system to write the command buffer through the PCIe fabric to the computer memory of the cloud storage system. The method also includes operating the cloud compute system to notify the cloud storage system through the PCIe fabric that the command buffer has been written to the computer memory of the cloud storage system. The method also includes operating the cloud storage system to read the command buffer from the computer memory of the cloud storage system. The method also includes operating the cloud storage system to process the command buffer to read requested data from a storage device accessible by cloud storage system. The method also includes operating the cloud storage system to write the requested data through the PCIe fabric to the computer memory of the cloud compute system. The method also includes operating the cloud storage system to notify the cloud compute system through the PCIe fabric that the requested data is in the computer memory of the cloud compute system.

In an example embodiment, a method is disclosed for requesting and transferring data in a cloud gaming system. The method includes having a cloud gaming system that includes a cloud storage system and a cloud compute system connected to each other through a PCIe fabric. The cloud storage system includes a computer memory. The cloud compute system includes a computer memory. The method also includes operating the cloud compute system to generate a command buffer for a data read operation. The method also includes operating the cloud compute system to write the command buffer to the computer memory of the cloud compute system. The method also includes operating the cloud compute system to notify the cloud storage system through the PCIe fabric that the command buffer has been written to the computer memory of the cloud compute system. The method also includes operating the cloud storage system to read the command buffer through the PCIe fabric from the computer memory of the cloud compute system. The method also includes operating the cloud storage system to process the command buffer to read requested data from a storage device accessible by cloud storage system. The method also includes operating the cloud storage system to write the requested data through the PCIe fabric to the computer memory of the cloud compute system. The method also includes operating the cloud storage system to notify the cloud compute system through the PCIe fabric that the requested data is in the computer memory of the cloud compute system.

In an example embodiment, a method is disclosed for requesting and transferring data in a cloud gaming system. The method includes having a cloud gaming system that includes a cloud storage system and a cloud compute system connected to each other through a PCIe fabric. The cloud storage system includes a computer memory. The cloud compute system includes a computer memory. The method also includes operating the cloud compute system to generate a command buffer for a data read operation. The method also includes operating the cloud compute system to write the command buffer to the computer memory of the cloud compute system. The method also includes operating the cloud compute system to notify the cloud storage system through the PCIe fabric that the command buffer has been written to the computer memory of the cloud compute system. The method also includes operating the cloud storage system to read the command buffer through the PCIe fabric from the computer memory of the cloud compute system. The method also includes operating the cloud storage system to process the command buffer to read requested data from a storage device accessible by cloud storage system and write the requested data in the computer memory of the cloud storage system. The method also includes operating the cloud storage system to notify the cloud compute system through the PCIe fabric that the requested data is in the computer memory of the cloud storage system. The method also includes operating the cloud compute system to read the requested data through the PCIe fabric from the computer memory of the cloud storage system.

In an example embodiment, a method is disclosed for data transfer in a cloud gaming system. The method includes having a cloud gaming system that includes a cloud storage system and a cloud compute system connected to each other through a PCIe fabric. The cloud storage system includes a computer memory. The cloud compute system includes a computer memory. The method also includes operating the cloud storage system to generate a file identification table that specifies memory addresses in the computer memory of the cloud storage system at which different data files are stored. The method also includes operating the cloud compute system to use the file identification table to determine a memory address in the computer memory of the cloud storage system at which a required data file is stored. The method also includes operating the cloud compute system to read the required data file through the PCIe fabric from the computer memory of the cloud storage system.

Other aspects of the invention will become more apparent from the following detailed description, taken in conjunction with the accompanying drawings, illustrating by way of example the present invention.

BRIEF DESCRIPTION OF THE DRAWINGS

FIG. 10 shows an example of a mapping table that maps file names to file identifiers, in accordance with some embodiments.

FIG. 15 shows a method for using a doorbell register exposed through a PCIe fabric to request and transfer data between the cloud storage system and the cloud compute system in the cloud gaming system, in accordance with some embodiments.

DETAILED DESCRIPTION

Figure 1A:
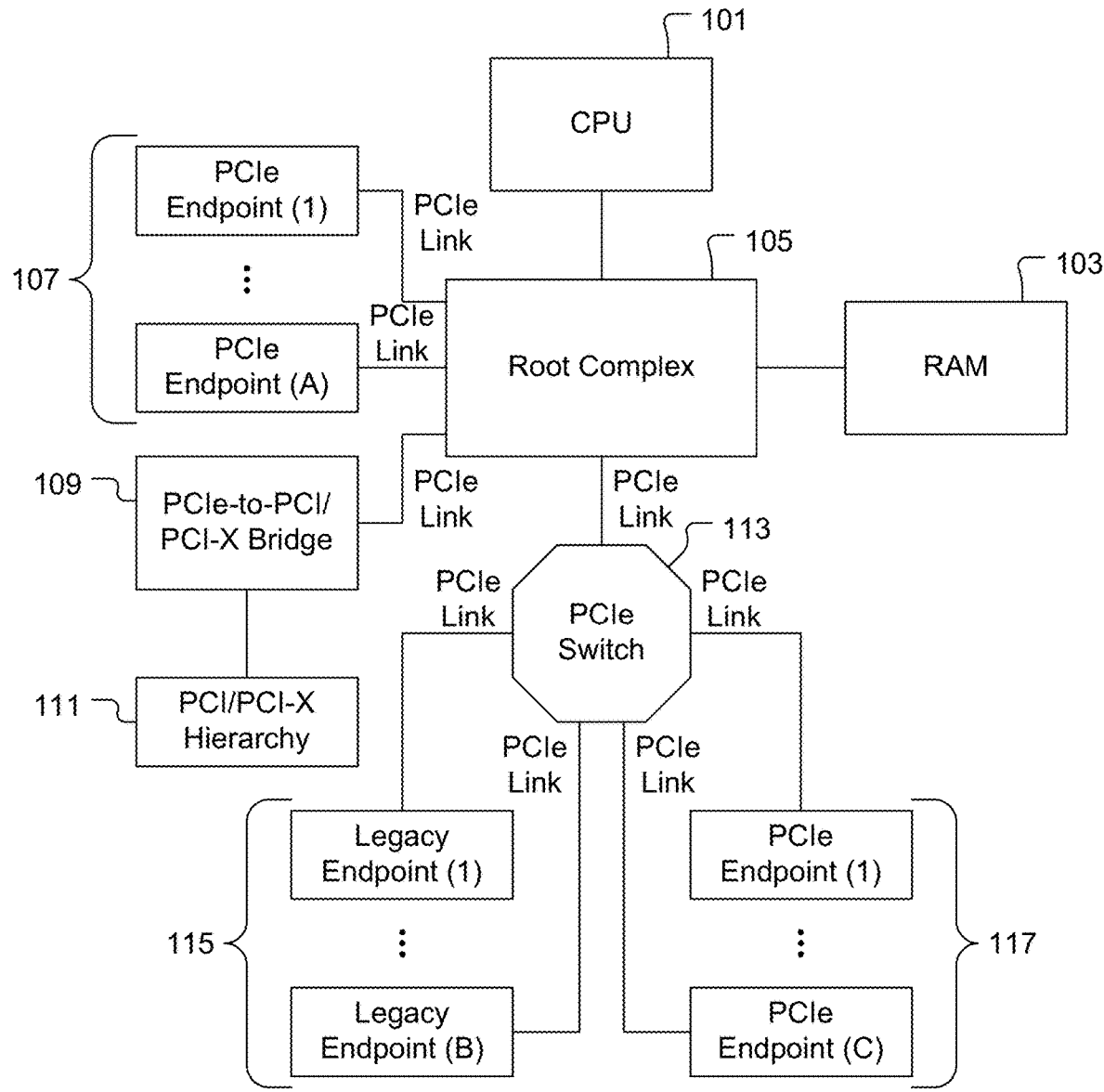
FIG. 1A shows a generalized diagram of a PCIe fabric.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

A rack design for a cloud gaming system can include a cloud storage system and many cloud compute systems, e.g., game consoles, where the cloud storage system is shared by the cloud compute systems. The cloud storage system can include fast storage devices such as solid-state-drives (SSD's) and hard-disk-drives (HDD's). The rack design for the cloud gaming system assumes that the data storage and retrieval capability of the cloud storage system is faster than the data storage and retrieval capability of the cloud compute system, e.g., of a SSD or HDD of a local game console within the rack. However, the data storage and retrieval capability, e.g., data write speed and/or data read speed, of the cloud compute system (game console) has improved significantly. For example, the data storage and retrieval speed of the cloud compute system has become faster than what is possible with currently available non-volatile memory express (NVMe) SSD's. Therefore, a current challenge for the rack-based cloud gaming system is to ensure that data can be exchanged between the cloud compute system and the cloud storage system within the rack in an efficient enough manner to avoid delays in operation of the cloud compute system.

Also, it is not currently possible to address the above-mentioned challenge by simply replacing the extant data storage devices within the cloud storage system with faster data storage devices, because the fastest data storage devices currently available are not fast enough to keep up with the data demand of the cloud compute system using the conventional data exchange infrastructure, e.g., networking, that connects the cloud compute system with the cloud storage system. Additionally, the current data exchange infrastructure that connects the cloud compute system with the cloud storage system in the cloud gaming rack design is performance-challenged with regard to delivering required data across many cloud compute systems at the same time. And, the increasing expense of the current data exchange infrastructure that connects the cloud compute systems with the cloud storage system in the cloud gaming rack design is of concern.

Systems and methods are disclosed herein in which a peripheral component interconnect express (PCIe) fabric is used to connect the multiple cloud compute systems to the cloud storage system within a rack of a cloud gaming system. Use of the PCIe fabric to connect the multiple cloud compute systems to the cloud storage system within the rack of the cloud gaming system enables storage of game content directly in a computer memory on the cloud storage system for use by the multiple cloud compute systems. In some embodiments, the computer memory on the cloud storage system is a random access memory (RAM). In some embodiments, the computer memory on the cloud storage system is a storage class memory that behaves like RAM, but is persistent in that data stored in the storage class memory is not lost when power supplied to the computer memory is turned off. In some embodiments, storage class memory provides higher data storage capacity than RAM. In some embodiments, storage class memory is configured as a hybrid memory module that uses a large amount of flash memory or equivalent technology paired with RAM. Because storage class memory behaves like RAM, the PCIe switch can address the storage class memory in the same way that is used to address RAM. Also, use of the PCIe fabric to connect the multiple cloud compute systems to the cloud storage system within the rack of the cloud gaming system provides for initial storage of video game content on NVMe data storage devices accessible by the cloud storage system, and population of the video game content from the NVMe data storage devices to the computer memory of the cloud storage system upon a cache miss event that occurs when any one of the cloud compute systems attempts to read particular video game content from the computer memory of the cloud storage system. NVMe is an open logical device interface specification for accessing non-volatile storage media, e.g., NAND flash memory, among others, attached via a PCIe link.

In the systems and methods disclosed herein, PCIe switching capability is utilized to connect multiple cloud compute systems to one or more shared cloud storage systems. In various embodiments, the multiple cloud compute systems and the one or more shared cloud storage systems are installed in one or more racks in a computing center. The cloud compute system that is installed in the rack in the computing center is not to be confused with a remote client system that is local to a user, e.g., player of a video game. More specifically, it should be understood that in some embodiments the cloud compute system and the cloud storage system in the rack in the computing center work together to generate and transmit streaming video of a video game to the remote client system of the user that is playing the video game. Use of PCIe switching capability to connect multiple cloud compute systems to one or more shared cloud storage systems provides a technological basis for solving cloud gaming performance challenges, such as ensuring that data can be exchanged between the cloud compute systems and the cloud storage system within the rack in an efficient enough manner to avoid delays in operation of the cloud compute systems, and such as delivering required data across many cloud compute systems at the same time.

PCIe is a high-performance, general purpose, input/output interconnect that is described in the PCI Express® Base Specification Revision 5.0, Version 1.0, published by the Peripheral Component Interconnect Special Interest Group (PCI-SIG), which is an electronics industry consortium responsible for specifying the Peripheral Component Interconnect (PCI) computer bus, the Peripheral Component Interconnect eXtended (PCI-X) computer bus, and the PCIe computer bus. PCIe is a bidirectional point-to-point data bus originally designed for personal computers (PC's) and servers to provide for communication by a host device with other devices such as graphics processing units (GPU's), network cards, sound cards, storage controllers, etc. The PCI Express® Base Specification Revision 5.0, Version 1.0, is incorporated herein by reference in its entirety for all purposes. It should be understood that any PCIe feature referenced herein refers to the corresponding PCIe feature as described in any revision and/or version of PCI Express® Base Specification as published by PCI-SIG. Therefore, it should be understood that any PCIe feature referenced herein is not limited to just the description of the corresponding PCIe feature in Revision 5.0, Version 1.0, of the PCI Express® Base Specification, but can correspond to the description of the corresponding PCIe feature in any revision and/or version of PCI Express® Base Specification as published by PCI-SIG.

FIG. 1A shows a generalized diagram of the PCIe fabric. The PCIe fabric includes point-to-point PCIe links that interconnect various components. The components and PCIe links in the PCIe fabric define a hierarchy. The example PCIe fabric of FIG. 1A shows a central processing unit (CPU) 101 and a computer memory 103 of a host device connected to a root complex 105 of the host device. In various embodiments, the computer memory 103 can be RAM or storage class memory, or another type of computer memory substantially equivalent to RAM and/or storage class memory. The root complex 105 represents the root of an input/output hierarchy that connects the CPU 101 and computer memory 103 to input/output ports of the host device. The root complex 105 can have any number of PCIe ports. Each PCIe port of the root complex 105 is an interface that defines a separate hierarchy domain, where each hierarchy domain corresponding to the ports of the root complex 105 can include any number of endpoints or a sub-hierarchy domain that includes one or more PCIe switch(es) and associated endpoint(s). For example, FIG. 1A shows that some ports of the root complex 105 are connected to a number of PCIe endpoints 107 through respective PCIe links. Each PCIe endpoint 107 can be any type of system element, such as a processor, controller, module, etc., that utilizes the PCIe bus architecture and protocol. In general, an endpoint in the PCIe fabric refers to a type of function that can be the requestor or completer of a PCIe transaction. An endpoint in the PCIe fabric can be either a legacy endpoint, a PCIe endpoint, or a root complex integrated endpoint.

Also, FIG. 1A shows that a port of the root complex 105 is connected to a PCIe-to-PCI/PCI-X Bridge 109 through a PCIe link. The PCIe-to-PCI/PCI-X Bridge 109 functions to virtually or actually connect a PCI/PCI-X hierarchy 111 to the PCIe fabric, e.g., to the PCIe port of the root complex 105. FIG. 1A also shows a PCIe port of the root complex 105 connected to a PCIe switch 113 through a PCIe link. The PCIe switch 113 functions to connect two or more PCIe ports to allow data packets to be routed from one port to another port. In the example of FIG. 1A, the PCIe switch 113 includes an upstream PCIe port connected to the root complex 105. The PCIe switch 113 also includes a number of downstream PCIe ports connected to a number of legacy endpoints 115 through respective PCIe links. The PCIe switch 113 also includes a number of downstream PCIe ports connected to the a number of PCIe endpoints 117 through respective PCIe links. The PCIe switch 113 appears to configuration software as a collection of two or more virtual (logical) PCI-to-PCI bridges.

Figure 1B:
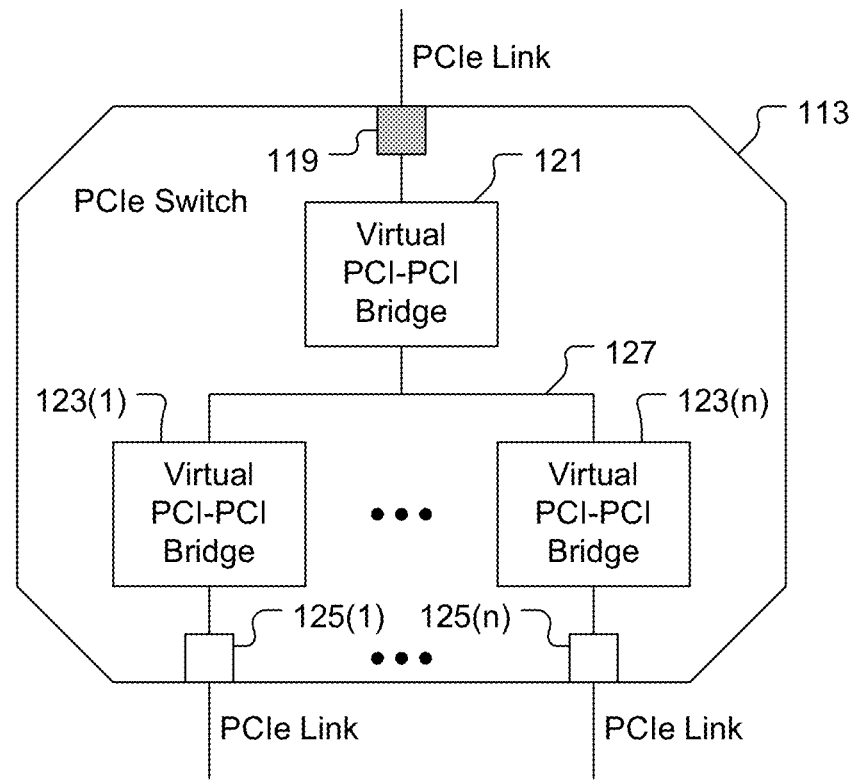
FIG. 1B shows an example configuration of a PCIe switch.

FIG. 1B shows an example configuration of the PCIe switch 113. The PCIe switch 113 includes an upstream PCIe port 119 and one or more downstream PCIe port(s) 125(1)-125(n). Each of the upstream PCIe port 119 and the one or more downstream PCIe port(s) 125(1)-125(n) is connected to a respective PCIe link. The PCIe switch 113 includes a virtual PCI-PCI bridge 121 connected to the upstream PCIe port 119. The PCIe switch 113 also includes virtual PCI-PCI bridge(s) 123(1)-123(n) respectively connected to the one or more downstream PCIe port(s) 125(1)-125(n). The collection of virtual PCI-PCI bridges 121 and 123(1)-123(n) are connected together within the PCIe switch 113, as indicated by the lines 127. The PCIe switch 113 functions to forward transactions using PCI bridge mechanisms, such as address-based routing. The PCIe switch 113 also functions to forward all types of transaction layer packets between any set of PCIe ports. Each PCIe port of the PCIe switch 113 is configured to comply with PCIe transaction flow control specifications.

Figure 1C:
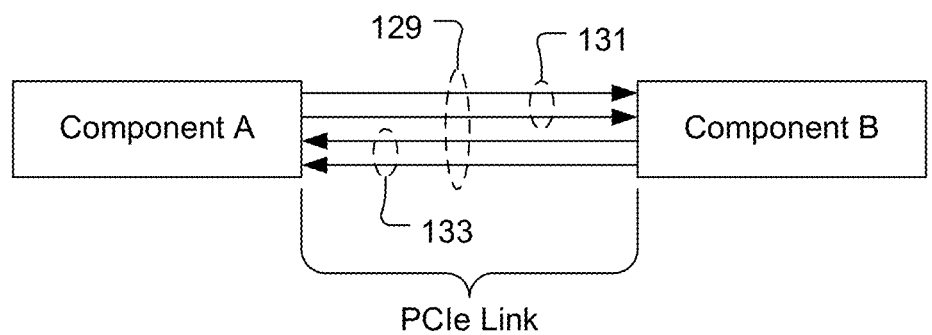
FIG. 1C shows a diagram of a PCIe link that includes one PCIe lane.

A PCIe link represents a dual-simplex data communication channel between two components. The PCIe link supports at least one PCIe lane. FIG. 1C shows a diagram of a PCIe link that includes one PCIe lane 129. FIG. 1C shows that one PCIe lane 129 includes a low-voltage, differentially driven transmit pair of conductors 131, and a low-voltage, differentially driven receive pair of conductors 133, where Component A is considered the transmitter component and Component B is considered the receiver component. The transmit pair of conductors 131 forms a unidirectional differential signal conveyance mechanism. The receive pair of conductors 133 forms a unidirectional differential signal conveyance mechanism. Therefore, the single PCIe lane 129 includes four electrical signal conductors or traces.

Data is transmitted across a PCIe lane at one bit per cycle. To increase bandwidth and obtain higher data throughput, a PCIe link can aggregate multiple PCIe lanes. The size of a PCIe link is designated by xN, where N is the number of PCIe lanes in the PCIe link. An x1 PCIe link has one PCIe lane (four wires), and carries one bit per cycle in each of the transmitting and receiving directions. An x2 PCIe link has two PCIe lanes (8 wires), and carries two bits per cycle in each of the transmitting and receiving directions. An x4 PCIe link has four PCIe lanes (16 wires), and carries four bits per cycle in each of the transmitting and receiving directions. The PCIe specification describes operation for PCIe link sizes of x1, x2, x4, x8, x12, x16, and x32.

A PCIe connection is a serial connection that operates like a network, rather than a bus. In the PCIe fabric, each PCIe link is mapped through a virtual PCI-to-PCI bridge and has an associated logical PCI bus. In the example of FIG. 1A, the virtual PCI-to-PCI bridge of a given PCIe link can be part of a PCIe port of the root complex 105, or part of the upstream PCIe port 119 of the PCIe switch 113, or part of the downstream PCIe port 125(1)-125(n) of the PCIe switch 113. A PCIe port of the root complex 105 is referred to as a root port and is a virtual PCI-to-PCI bridge that originates a PCIe hierarchy domain from the root complex 105. Devices within the PCIe fabric are mapped into configuration space such that each device will respond to a particular device number.

Figure 2A:
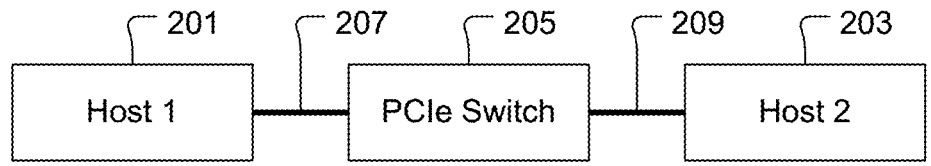
FIG. 2A shows a diagram of how the PCIe fabric can be used to connect two different host computing devices, in accordance with some embodiments of the present invention.

The PCIe fabric was originally designed to provide for data communication between a host computing device and a client computing device. However, the PCIe fabric can also be used to provide for data communication between different host computing devices, although this application and corresponding technology is not included in the PCIe specification. To achieve host device-to-host device data communication over the PCIe fabric, extra hardware is required in the form of a PCIe switch. FIG. 2A shows a diagram of how the PCIe fabric can be used to connect two different host computing devices, in accordance with some embodiments of the present invention. Specifically, FIG. 2A shows a first host computing device 201 connected to a second host computing device 203 by way of a PCIe switch 205. A root complex of the first host computing device 201 has a PCIe port connected to a PCIe port of the PCIe switch 205 through a PCIe link 207. Also, a root complex of the second host computing device 203 has a PCIe port connected to a PCIe port of the PCIe switch 205 through a PCIe link 209. The PCIe switch 205 includes programmable logic to bridge the memory address spaces of the first host computing device 201 and the second host computing device 203. For example, the logic for bridging the memory address spaces of the first host computing device 201 and the second host computing device 203 can include a non-transparent bridge (NTB) or a special direct memory access (DMA) engine that can communicate with both the first host computing device 201 and the second host computing device 203 and take care of any memory address translation that is required.

To understand why it is non-trivial to connect different host computing devices to have direct data communication capability with each other, it is informative to consider the boot process of a host computing device. During the boot process of a host computing device, the host computing device creates a memory map through its Basic Input/Output System (BIOS), or through its Unified Extensible Firmware Interface (UEFI), or through its operating system (OS), depending on the configuration of the host computing device. The memory map of the host computing device is an assignment of memory addresses to the computer memory of the host computing device and to the memory mapped component devices that are connected to the host computing device. It should be understood that a modern component device that may be connected to the host computing device appears as memory from a software development perspective. Some examples of component devices include a graphics processing unit (GPU), a storage CPU, a decrypt/encrypt engine, a decompress/compress engine, a direct memory access (DMA) controller, a non-volatile memory express (NVMe) solid-state-drive (SSD), a serial advanced technology attachment (SATA) controller, a hard-disk-drive, among others. Many component devices can be connected to the host computing device. For a host computing device that has a PCIe root complex, an enumeration process takes place at system startup in which component devices that are connected to the host computing device are discovered, and in which each component device is assigned a unique memory address range in the memory map of the host computing device.

While it is possible to electrically connect multiple host computing devices together in a direct manner through PCIe links, such a direct connection is problematic because each host computing device independently creates its own memory map at startup, which causes memory address conflicts among the multiple memory maps created by the multiple host computing devices. However, connection of a PCIe switch between different host computing systems, such as shown in FIG. 2A, solves the memory address conflict problem among the different host computing systems because the PCIe switch appears as another component device in the memory map that is independently created by the host computing device. Logic within the PCIe switch, e.g., NTB logic, functions to "map" memory in one host computing device to a location within the memory map of the other host computing device, thereby allowing for "shared memory" between the host computing devices. For example, with regard to FIG. 2A, logic within the PCIe switch 205 functions to map a memory address range in the first host computing device 201 to a memory address range in the second host computing device 203, and vice-versa.

Figure 2B:
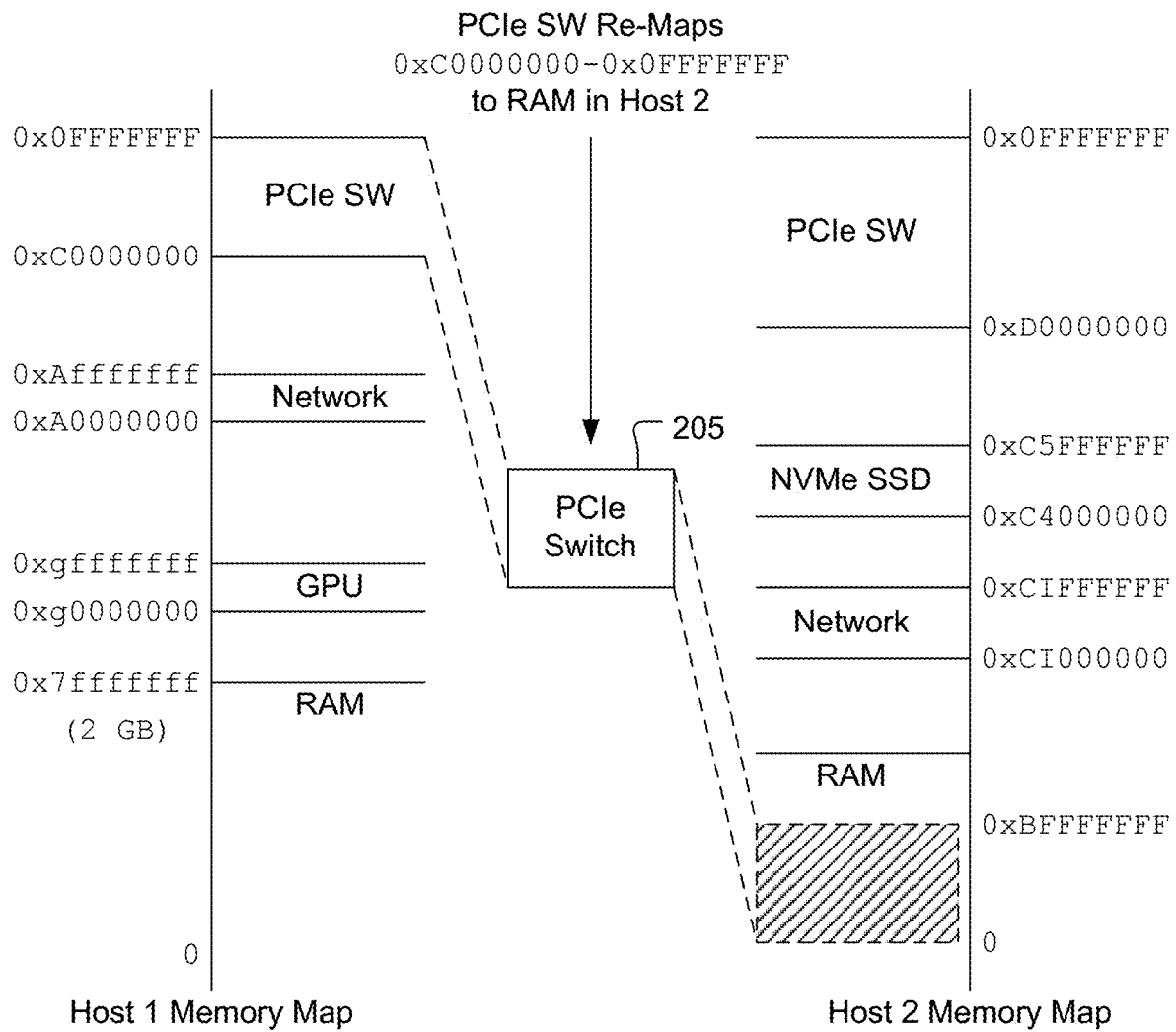
FIG. 2B shows an example diagram of a memory mapping function performed by the PCIe switch in the host device-to-host device connection arrangement of FIG. 2A, in accordance with some embodiments of the present invention.

FIG. 2B shows an example diagram of a memory mapping function performed by the PCIe switch 205 in the host device-to-host device connection arrangement of FIG. 2A, in accordance with some embodiments of the present invention. A left portion of FIG. 2B shows a memory map of the first host computing device 201 that is independently created by the first host computing device at startup. A right portion of FIG. 2B shows a memory map of the second host computing device 203 that is independently created by the second host computing device at startup. The memory map of the first host computing device 201 includes a memory address range for the PCIe switch 205 at 0xC0000000 to 0x0FFFFFFF (2 gigabyte (GB) in size by way of example). In the example of FIG. 2B, access by the first host computing device 201 to memory address range for the PCIe switch 205 at 0xC0000000 to 0x0FFFFFFF is remapped by the remapping logic in the PCIe switch 205 to a corresponding memory address range in the memory map of the second host computing device 203, e.g., to the first 2 GB in the memory map of the second host computing device 203 in this example. It should be understood that a given memory address range in the memory map of the first host computing device 201 can be re-mapped by the PCIe switch 205 to any memory address range of corresponding size in the memory map of the second host computing device 203. Also, it should be understood that a given memory address range in the memory map of the first host computing device 201 can be re-mapped by the PCIe switch 205 to any multiple memory address ranges of cumulative corresponding size in the memory map of the second host computing device 203. Generally speaking, it should be understood that mapping of memory between different host computing devices by the PCIe switch through which they are connected effectively provides for shared memory between the different host computing devices.

Figure 3A:
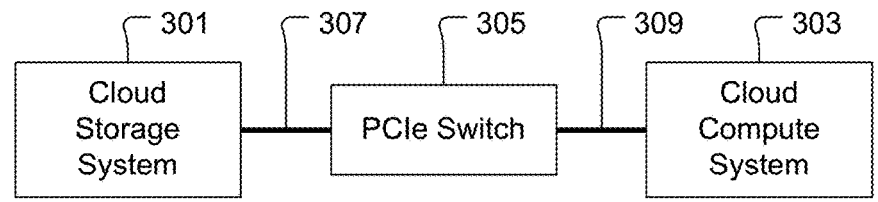
FIG. 3A shows a diagram of how the PCIe fabric can be used to connect a cloud storage system and a cloud compute system, in accordance with some embodiments of the present invention.

FIG. 3A shows a diagram of how the PCIe fabric can be used to connect a cloud storage system 301 and a cloud compute system 303, in accordance with some embodiments of the present invention. Specifically, FIG. 3A shows the cloud storage system 301 connected to the cloud compute system 303 by way of a PCIe switch 305. A PCIe switch 305 connects the cloud storage system 301 and the cloud compute system 303 and enables sharing of memory between the cloud storage system 301 and the cloud compute system 303. The cloud storage system 301 is connected to the PCIe switch 305 through a PCIe link 307. The cloud compute system 303 is connected to the PCIe switch 305 through a PCIe link 309. In some embodiments, the PCIe switch 305 is disposed within the client compute system 303. However, it should be understood that in other embodiments, the PCIe switch 305 can be located external to the cloud compute system 303.

Figure 3B:
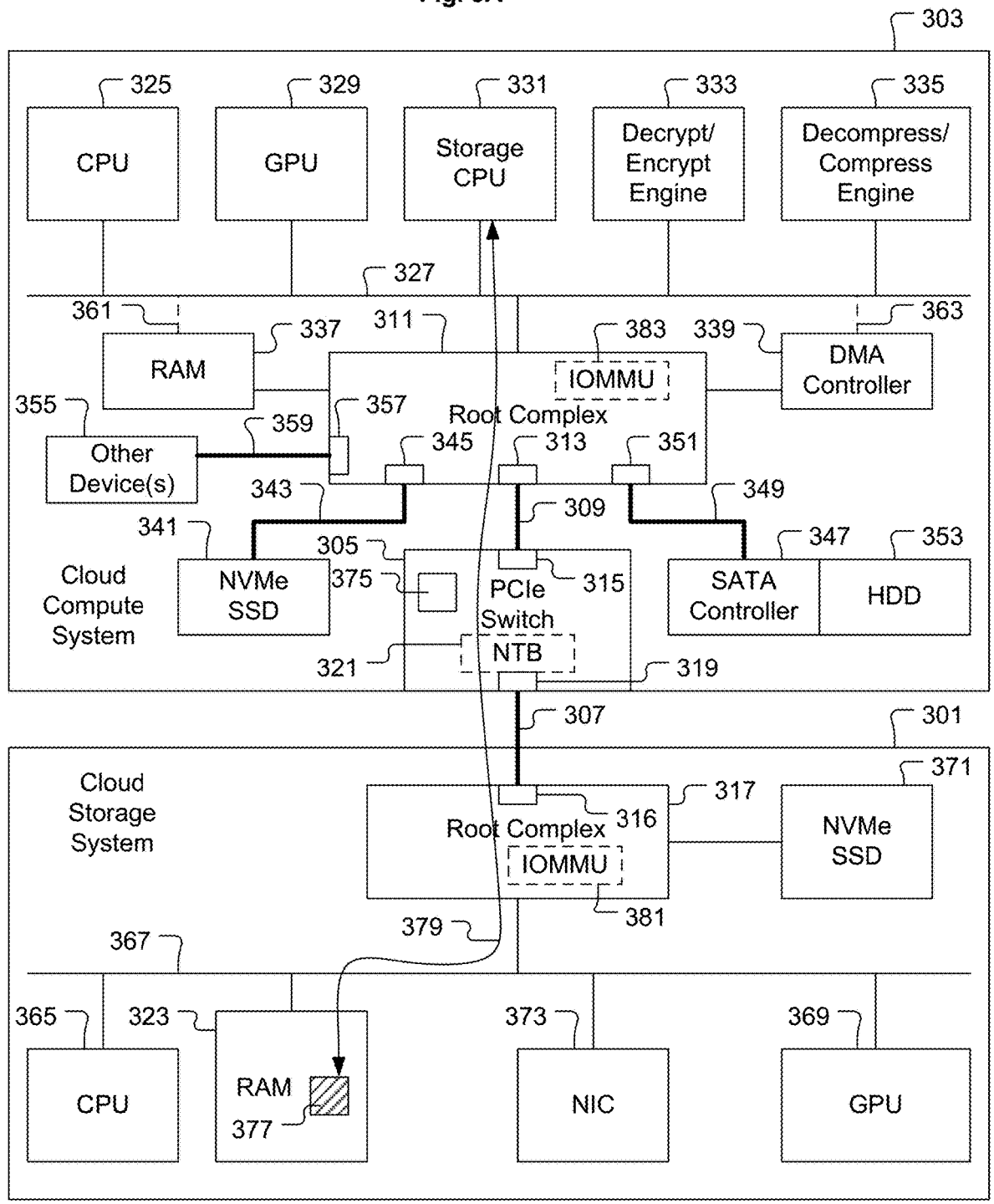
FIG. 3B shows an example diagram of some internal components of the cloud storage system and the cloud compute system, in accordance with some embodiments.

FIG. 3B shows an example diagram of some internal components of the cloud storage system 301 and the cloud compute system 303, in accordance with some embodiments. A root complex 311 of the cloud storage system 301 has a PCIe port 313 connected to a PCIe port 315 of the PCIe switch 305 through the PCIe link 307. Also, a root complex 317 of the cloud compute system 303 has a PCIe port 316 connected to a PCIe port 319 of the PCIe switch 305 through the PCIe link 309. The PCIe switch 305 includes logic to bridge the memory address spaces of the cloud storage system 301 and the cloud compute system 303. For example, the logic for bridging the memory address spaces of the cloud storage system 301 and the cloud compute system 303 can include a non-transparent bridge (NTB) or a special direct memory access (DMA) engine that can communicate with both the cloud storage system 301 and the cloud compute system 303 and take care of any memory address translation that is required. In some embodiments, a DMA engine can be implemented within the PCIe switch 305. It should be understood that both the root complex 311 of the cloud compute system 303 and the root complex 317 of the cloud storage system 301 include a PCIe interface or equivalent interface, such as a Gen-Z interface defined in accordance with the Gen-Z communication/interconnect specification developed by the Gen-Z Consortium, by way of example, or other future-developed interface that is essentially equivalent to either the PCIe interface or the Gen-Z interface.

For example, in some embodiments, the PCIe switch 305 optionally includes an NTB 321. If the PCIe switch 305 includes the NTB 321 and is in NTB mode, the NTB 321 functions to translate the physical memory address in a memory access command written to a data I/O (input/output) command buffer by the cloud compute system 303 to a memory address that is reachable by the cloud storage system 301 within a computer memory 323 of the cloud storage system 301. The NTB 321 functionally operates to modify memory addresses at the PCIe transaction layer in which transaction layer packets (TLP's) are assembled and disassembled. In some embodiments, the NTB 321 also operates to modify requester identifiers. If the cloud compute system 303 generates a command buffer, such as by way of a storage CPU 331, the command buffer is ultimately wrapped in a TLP by the root complex 311. The storage CPU 331 operates to ensure the correctness of any memory addresses within the command buffer generated by the storage CPU 331. Also, the storage CPU 331 operates to ensure that any memory addresses within the command buffer are translated addresses in case the cloud storage system 301 needs to write data back to the cloud compute system 303. The NTB 321 comes into play when the cloud compute system 303 writes a command buffer to a memory address in the cloud storage system 301. In this case, the memory address to which the command buffer is written is translated by the NTB 321 and/or by an Output Memory Management Unit (IOMMU) 381 in the computer memory 323 of the cloud storage system 301. The IOMMU 381 maps device-visible virtual memory addresses to physical memory addresses. Also, in this case, the contents of the command buffer itself is not modified by either the NTB 321 or the IOMMU 381.

The NTB mode enables multiple root complexes to talk to each other, i.e., exchange data with each other. In some embodiments, if the PCIe switch 305 is connected to a secondary PCIe switch to which only NTB devices are connected, the secondary PCIe switch does not need to use NTB, as it would just forward transaction layer packets (TLPs). In various embodiments, the computer memory 323 can be RAM or storage class memory, or another type of computer memory substantially equivalent to RAM and/or storage class memory. The NTB 321 handles translation of the memory address in the data I/O command buffer and provides the translated memory address to the cloud storage system 301. If the PCIe switch 305 does not use the NTB 321, the memory access command written to the data I/O command buffer can be generated to include other metadata, such as a host identifier or other type of metadata, that can be used to determine the memory address in the computer memory 323 of the cloud storage system to which the memory address in the data I/O command buffer should be mapped. In some embodiments in which the PCIe switch 305 does not use the NTB 321, a DMA engine can be used to send packets across the PCIe switch 305 to the correct destination. And, in some embodiments, if the PCIe switch 305 does not use the NTB 321 and is connected to a secondary PCIe switch, the secondary PCIe switch operates to forward the packets to the correct destination.

The cloud compute system 303 includes at least one CPU 325 connected to an internal data bus 327. In various embodiments, the cloud compute system 303 can also include one or more of a GPU 329 connected to the internal data bus 327, and/or one or more of the storage CPU 331 connected to the internal data bus 327, and/or one or more of a decryption/encryption engine 333 connected to the internal data bus 327, and/or one or more of a decompression/compression engine 335 connected to the internal data bus 327. The internal data bus 327 is connected to the root complex 311 of the cloud compute system 303. In various embodiments, the GPU 329 is a processor configured to perform parallel operations for rendering images, animations, and video for display on an electronic display screen. Also, in some embodiments, the parallel processing capabilities of the GPU 329 can be used for vector processing in non-graphics applications that require repetitive computations.

In various embodiments, the storage CPU 331 is configured to handle requests for storage commands and allocate storage on a specific type of storage media. In various embodiments the storage CPU 331 and the main CPU 325 can either have the same or different architectures. For example, in some embodiments, the storage CPU 331 can be an Advanced RISC (Reduced Instruction Set Computer) Machine (ARM) processor or a MIPS processor, with the main CPU 325 being an x86 processor. It should be understood that in various embodiments, the storage CPU 331 can be essentially any type of suitable computer processor, and the main CPU 325 can be essentially any type of suitable computer processor. The specific type of storage media to which the storage CPU 331 allocates data for storage can vary depending on the performance capabilities, e.g., data read speed and/or data write speed, of the storage media and/or the form in which data is stored on the storage media, e.g., file-based data storage, folder-based data storage, or byte-based data storage. In some embodiments, the storage CPU 331 operates to split data into multiple data chunks for placement into respective locations in a computer memory 337 of the cloud compute system 303, with the various storage locations in the computer memory 337 being tracked and updated based on a storage table. In various embodiments, the computer memory 337 can be RAM or storage class memory, or another type of computer memory substantially equivalent to RAM and/or storage class memory. The storage CPU 331 can also function to optimize storage based on Input/Output Operations per Second (IOPS). In some embodiments, storage optimization based on TOPS can be correlated to the access speeds of the available storage media, which can include rotating storage media, solid-state storage media, and/or hybrid storage media. In various embodiments, the decryption/encryption engine 333 is a processor configured for and dedicated to applying cryptographic algorithms to decrypt encrypted data and to encrypt non-encrypted data. In various embodiments, the decompression/compression engine 335 is configured for and dedicated to applying algorithms to decompress compressed data and compress non-compressed data.

In some embodiments, the computer memory 337 of the cloud compute system 303 is connected to the root complex 311. In some embodiments, the cloud compute system 303 also includes a DMA controller 339 connected to the root complex 311. In some embodiments, the computer memory 337 and/or the DMA controller 339 can be connected to the internal data bus 327, as indicated by lines 361 and 363, respectively. Also, in some embodiments, the cloud compute system 303 can include one or more of a NVMe SSD 341 connected through a PCIe link 343 to a PCIe port 345 of the root complex 311. Also, in some embodiments, the cloud compute system 303 can include one or more of a SATA controller 347 connected through a PCIe link 349 to a PCIe port 351 of the root complex 311. The SATA controller 347 can function as a bridge between one or more of a HDD 353 and the PCIe fabric. Also, in various embodiments, one or more other PCIe-enabled component device(s) 355 can be connected to respective PCIe port(s) 357 of the root complex 311 through respective PCIe links 359. In various embodiments, the other PCIe-enabled component device(s) 355 can include one or more GPU's, one or more filed programmable gate arrays (FPGA's), one or more network adapters, one or more SSD's, one or more SATA/HHD's, among other devices. It should be understood that the architecture of the cloud compute system 303 shown in FIG. 3B is provided by way of example. In various embodiments, the cloud compute system 303 can include more or less components than what is shown in the example of FIG. 3B.

The cloud storage system 301 includes at least one CPU 365 connected to an internal data bus 367. In various embodiments, the cloud storage system 301 can also include one or more of a GPU 369 connected to the internal data bus 367 and/or one or more of a network interface card (NIC) 373 connected to the internal data bus 367. The internal data bus 367 is connected to the root complex 317 of the cloud storage system 301. The cloud storage system 301 can also include one or more of a NVMe SSD 371 connected to the root complex 317. Also, in some embodiments, the GPU 369 and/or the NIC 373, and/or other device, can be configured to use PCIe and can be connected directly to the root complex 317 rather than to the internal data bus 367.

In some embodiments, the cloud storage system 301 is configured and operated to distribute data storage among a plurality of physical storage media and utilize data deduplication methods to optimize usage of the plurality of physical storage media. The plurality of physical storage media accessible/controlled by the cloud storage system 301 can be located in a plurality of different storage boxes that are interconnected by high-speed interconnects as well as by high-speed switches. In some embodiments, the plurality of different storage boxes that include the plurality of physical storage media accessible/controlled by the cloud storage system 301 can be installed in separate locations within a data center or among multiple data centers that are geographically distributed. In some embodiments, data storage can be managed among multiple data centers using a caching system, so that data utilized or required for a specific requesting entity, e.g., for a specific remote client device used by a user to play a cloud gaming application, can be moved to particular data center that is closest to the requesting entity or that provides an acceptable quality of service for the requesting entity. In some embodiments, the caching system can utilize a migration algorithm defined to migrate user data and/or game data to specific data centers, which can include specific edge compute servers or nodes, such as the cloud compute system 303. The cloud compute system 303 generates and transmits memory access commands to data I/O command buffers of the cloud storage system 301 to ensure that a requesting entity will have the necessary data/information for rendering application output, such as graphical output for a game, with an allowable latency.

Data storage for a cloud gaming application can be managed by a plurality of data buffers that are stored in cloud system memory, such as in the computer memory 337 of the cloud compute system 303 and/or in the computer memory 323 of the cloud storage system 301. In some embodiments, these data buffers are optimized for rendering frames of video that are to be compressed and transmitted over a network to a requesting entity. The data buffers can be used to store data for compressed video frames, e.g., I-frames and P-frames. In typical cloud gaming applications, a scene change in a game will require a new I-frame to be generated and transmitted to the requesting entity. When this happens, the storage CPU 331 can receive information from the decompression/compression engine 335 to clear out P-frames from the data buffers in the computer memory 337 since a new I-frame will be required for a new scene, e.g., for a cut-scene. In some embodiments, the storage CPU 331 may not keep track of which data buffers store data for video frames, such as I-frames and P-frames. In these embodiments, the information received by the storage CPU 331 from the decompression/compression engine 335 can specify which data buffers are to be cleared in order to clear out the necessary P-frames. Accordingly, it should be understood that data storage operations are coordinated operations that require handling of data buffers and storage devices in the cloud compute system 303 and the cloud storage system 301.

In some embodiments, data storage handling and buffering in the cloud compute system 303 and/or the cloud storage system 301 can utilize artificial intelligence (AI) for loading computer memory 337 and/or computer memory 323 with data that is anticipated to be used by a cloud gaming application, so that more efficient loading and processing of graphics data can be performed in anticipation of new scenes that may be required by execution of the cloud gaming application. It should be understood that AI operations can be performed at various levels of the cloud compute system 303 and/or the cloud storage system 301 in order to optimize the retrieval of data in anticipation of data required for rendering of video frames of the cloud gaming application. In some embodiments, the AI operations can be optimized over time based on machine learning and continual feedback from one or more requesting entities, e.g., from one or more users that play the cloud gaming application. For instance, in some embodiments, machine learning can be used to identify specific types of scenes in games that will require faster retrieval of data from the cloud storage system 301 for timely processing of graphics. In turn, the specific types of game scenes that are identified as requiring faster data retrieval can trigger temporally advanced data retrieval operations to reduce latency associated with streaming of video frames to the requesting entity.

The systems and methods disclosed herein leverage the PCIe fabric that connects the cloud compute system 303 with the cloud storage system 301 to allow the CPU 325 and/or the storage CPU 331 and/or the DMA controller 339 (and/or other device) on the cloud compute system 303 to direct sending of messages and copying of data between the computer memory 323 of the cloud storage system 301 and the computer memory 337 of the cloud compute system 303, vice-versa. The result of connecting the cloud compute system 303 and the cloud storage system 301 using the PCIe fabric and after configuring of the PCIe switch 305 is a "shared memory" mechanism across the cloud compute system 303 and the cloud storage system 301. The cloud compute system 303 can directly access a specified portion 377 of the computer memory 323 within the cloud storage system 301 with very little overhead, e.g., with bypassing of the CPU 365 of the cloud storage system 301, as indicated by the arrow 379. Direct access of the computer memory 323 within the cloud storage system 301 by the cloud compute system 303 can be directed by any device within the cloud compute system 303 that is capable of managing data storage requests and that is connected through the root complex 311 to the PCIe switch 305, such as the CPU 325 and/or the storage CPU 331 and/or the DMA controller 339. However, it should be appreciated that it may not be a most efficient use of the CPU 325 of the cloud compute system 303 to manage data storage requests. Therefore, the storage CPU 331 and/or the DMA controller 339 may be primarily used to manage data storage requests of the cloud compute system 303 by generating memory access commands that are written to data I/O command buffers in the computer memory 323 of the cloud storage system 301.

In addition to providing the "shared memory" mechanism, connection of the cloud compute system 303 to the cloud storage system 301 through the PCIe switch 305 provides for sending of "messages" from the cloud compute system 303 to the cloud storage system 301, and vice-versa, by writing a message directly into the computer memory 337 of the cloud compute system 303 or into the computer memory 323 of the cloud storage system 301 or into some memory within the PCIe switch 305. Sending of messages between the cloud compute system 303 and the cloud storage system 301 can be used to facilitate execution of memory access commands that are written to data I/O command buffers. For example, if the cloud compute system 303 expects the cloud storage system 301 to execute some memory access command that results in some requested data being retrieved from a data storage device and stored somewhere in the shared memory that exists among the cloud compute system 303 and the cloud storage system 301, a message can be written by the cloud storage system 301 to a memory location that is monitored by the cloud compute system 303 to notify the cloud compute system 303 when and where the requested data is available for use by the cloud compute system 303.

In some embodiments, messages can be sent by either the cloud compute system 303 or the cloud storage system 301 to one or more doorbell register(s) 375 exposed through the PCIe switch 305. In some embodiments, writing to the doorbell register 375 by the cloud compute system 303 will cause an interrupt to fire on the cloud storage system 301, which in turn causes the cloud storage system 301 to handle the interrupt. In some embodiments, handling of the interrupt by the cloud storage system 301 causes the cloud storage system 301 to read a message (some data) from a specified location in the shared memory that exists among the cloud compute system 303 and the cloud storage system 301. Similarly, writing to the doorbell register 375 by the cloud server system 301 will cause an interrupt to fire on the cloud compute system 303, which in turn causes the cloud compute system 303 to handle the interrupt. In some embodiments, handling of the interrupt by the cloud compute system 303 causes the cloud compute system 303 to read a message (some data) from a specified location in the shared memory that exists among the cloud compute system 303 and the cloud storage system 301.

The content of the message depends on the use case. In some use cases, the message can convey a request to read a certain amount data from a storage device and store the read data in the shared memory that exists among the cloud compute system 303 and the cloud storage system 301.

Then, after completion of the request in the message, another message can be sent to notify of completion. For example, if the cloud compute system 303 sends a first message that requests the cloud storage system 301 to read some particular data from data storage, the cloud storage system 301 will perform the request in the first message and then send a second message that notifies the cloud compute system 303 of completion of the first message request and where the particular requested data is stored in the shared memory that exists among the cloud compute system 303 and the cloud storage system 301.

The cloud compute system 303 and the cloud storage system 301 are independent systems that each has its own memory map. The memory map holds the memory addresses of computer memory and other devices in the system. The PCIe switch 305 takes up a user-configurable area of memory address space in each memory map of the cloud compute system 303 and the cloud storage system 301. In various embodiments, depending on the configuration of the PCIe switch 305, physical memory addresses in the computer memory 337 of the cloud compute system 303 can map to either the same or different physical memory addresses in the computer memory 323 of the cloud storage system 301.

In some embodiments, for security and/or other reasons, the cloud storage system 301 can be configured to hide its real physical memory addresses, such as by implementing the IOMMU 381 that maps device-visible virtual memory addresses to physical memory addresses. The IOMMU 381 is configured to map device memory addresses to physical memory addresses, whereas a regular memory management unit (MMU) is configured to map virtual memory addresses to physical memory addresses. For the regular MMU, the virtual memory addresses are continuous so that an application can see a block of memory, e.g., a block of 64 MB of memory, and operate on the block of memory, but in reality the MMU maps the continuous virtual memory addresses to multiple separated physical memory addresses and hides the memory mapping from the application. Similar to the regular MMU, the IOMMU 381 maps virtual memory addresses that are visible to the cloud compute system 303 to multiple separated physical memory addresses in the computer memory 323 and hides the memory mapping from the cloud compute system 303. In this manner, use of the IOMMU 381 allows the cloud compute system 303 to see a continuous block of virtual memory addresses present on the cloud storage system 301 while hiding the complexity of how the continuous block of virtual memory addresses is actually mapped to different physical memory addresses across the computer memory 323 of the cloud storage system 301. In some embodiments, the IOMMU 381 is included in the root complex 317 of the cloud storage system 301. In some embodiments, the root complex 311 of the cloud compute system 303 can also include an IOMMU 383.

In the configuration of FIG. 3B, the IOMMU 381 can allow the cloud compute system 303 to view a particular memory address (device address) as having a one-to-one correspondence with a particular physical memory address in the computer memory 323 of the cloud storage system 301, but in reality the IOMMU 381 can re-map the particular memory address as viewed by the cloud compute system 303 to a different physical memory address in the computer memory 323 of the cloud storage system 301. Also, in some embodiments, the IOMMU 381 can be used to block access to one or more specified physical memory area(s) in the computer memory 323 of the cloud storage system 301 that are not authorized to be accessed by the cloud compute system 303. Also, because the IOMMU 381 effectively hides memory fragmentation in the computer memory 323 of the cloud storage system 301 from the cloud compute system 303, use of the IOMMU 381 can simplify DMA transfer operations in the cloud compute system 303. For example, if the IOMMU 381 were not used to present fragmented physical memory addresses in the computer memory 323 as a continuous virtual block of memory addresses to the cloud compute system 303, the cloud compute system 303 would need to perform multiple DMA transfer operations or scatter/gather transactions to read data across the fragmented physical memory addresses in the computer memory 323. However, with use of the IOMMU 381 to present fragmented physical memory addresses in the computer memory 323 as a continuous virtual block of memory addresses to the cloud compute system 303, the cloud compute system 303 can perform a single DMA transfer operation to read data across the fragmented physical memory addresses in the computer memory 323.

Figure 4:
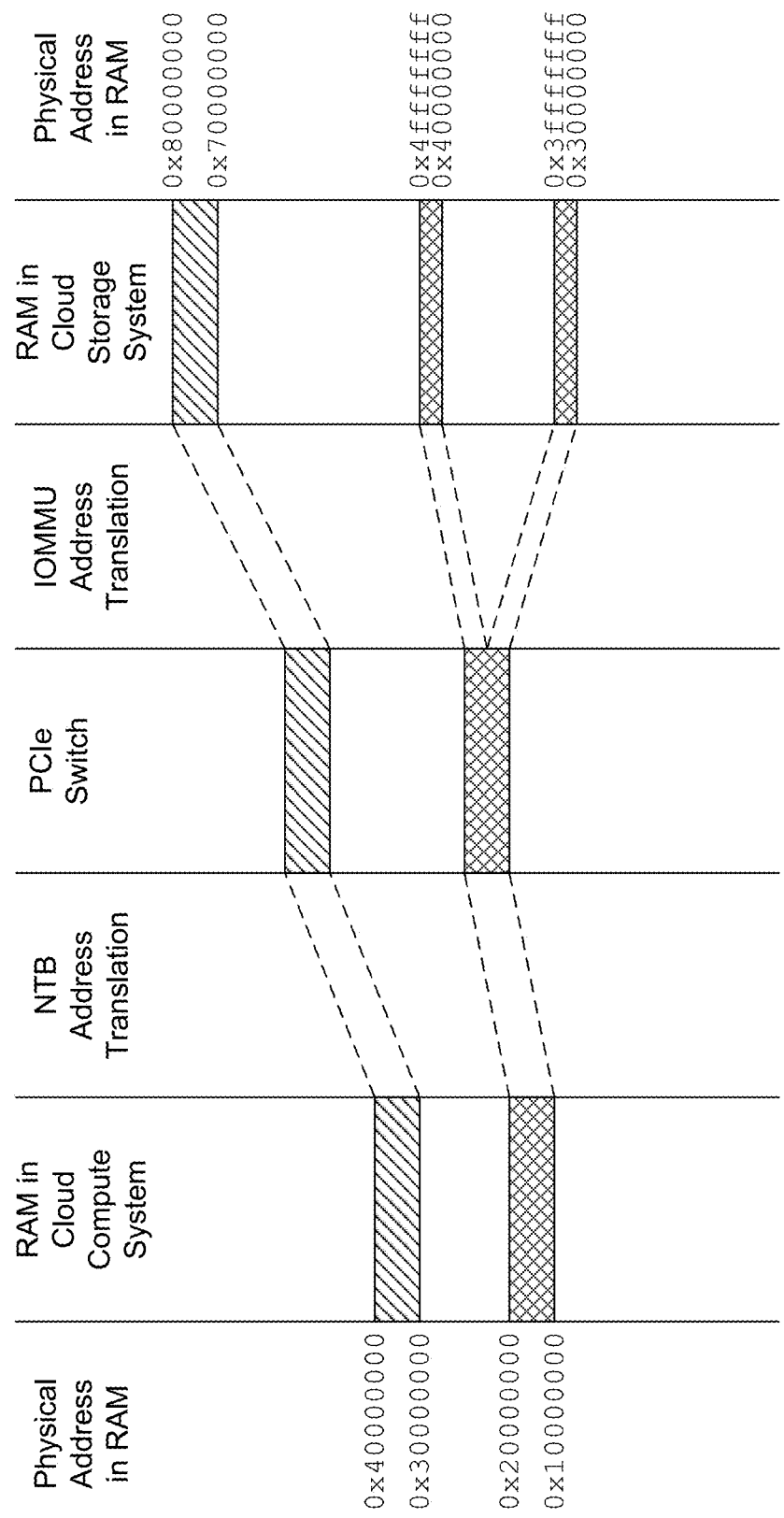
FIG. 4 shows an example diagram of a memory mapping function performed by the NTB in the PCIe switch and the IOMMU in the cloud storage system, in accordance with some embodiments of the present invention.

Both the NTB 321 in the PCIe switch 305 and the IOMMU 381 in the cloud storage system 301 perform memory address translation. FIG. 4 shows an example diagram of a memory mapping function performed by the NTB 321 in the PCIe switch 305 and the IOMMU 381 in the cloud storage system 301, in accordance with some embodiments of the present invention. FIG. 4 shows an example physical memory address range of 0x30000000-0x40000000 in the computer memory 337 of the cloud compute system 303 mapped to the physical memory address range of 0x70000000-0x80000000 in the computer memory 323 of the cloud storage system 301 by the NTB 321 in the PCIe switch 305 and the IOMMU 381 in the cloud storage system 301. The cloud compute system 303 does not know the real physical memory address range in the computer memory 323 of the cloud storage system 301 to which the visible memory address range of 0x30000000-0x40000000 is mapped. FIG. 4 also shows an example physical memory address range of 0x10000000-0x20000000 in the computer memory 337 of the cloud compute system 303 mapped in a fragmented manner to two physical memory address ranges of 0x30000000-0x3fffffff and 0x40000000-0x4fffffff in the computer memory 323 of the cloud storage system 301 by the NTB 321 in the PCIe switch 305 and the IOMMU 381 in the cloud storage system 301. The cloud compute system 303 does not know how the visible memory address range of 0x30000000-0x40000000 is mapped to the real physical memory address ranges in the computer memory 323 of the cloud storage system 301. The cloud compute system 303 is also not aware that the visible memory address range of 0x30000000-0x40000000 is actually fragmented in the computer memory 323 of the cloud storage system 301. And, the cloud compute system 303 does not need to be concerned about the visible memory address range of 0x30000000-0x40000000 being fragmented in the computer memory 323 of the cloud storage system 301.

Figure 5:
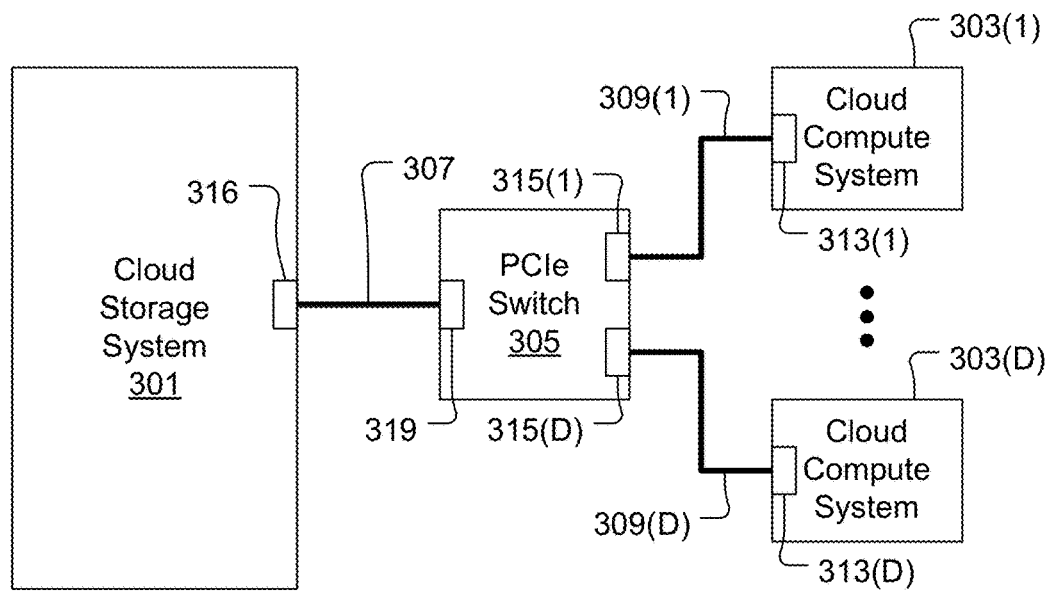
FIG. 5 shows a cloud gaming configuration in which the cloud storage system is connected to a number (D) of cloud compute systems through the PCIe switch, where D is greater than one, in accordance with some embodiments.

While FIGS. 3A and 3B show one cloud compute system 303 connected to one cloud storage system 301 through the PCIe switch 305, it should be understood that in other embodiments the cloud storage system 301 can be connected through a PCIe fabric to multiple cloud compute systems. For example, FIG. 5 shows a cloud gaming configuration in which the cloud storage system 301 is connected to a number (D) of cloud compute systems 303(1)-303(D) through the PCIe switch 305, where D is greater than one, in accordance with some embodiments. The PCIe switch 305 includes the number (D) of PCIe ports 315-315(D) to which the cloud compute systems 303(1)-303(D) are respectively connected through corresponding PCIe links 309(1)-309(D). In some embodiments, each of the PCIe links 309(1)-309(D) has a number (M) of PCIe lanes, and the PCIe link 307 that connects the cloud storage system 301 to the PCIe switch 305 has a number (N) of PCIe lanes. In some embodiments, the cloud storage system 301 is configured to provide a same data communication interface bandwidth to each of the cloud compute systems 303(1)-303(D). In these embodiments, the number (N) of PCIe lanes in the PCIe link 307 is equal to the number (D) of cloud compute systems 303(1)-303(D) multiplied by the number (M) of PCIe lanes in each PCIe link 309(1)-309(D). In some embodiments, it is not necessary for each cloud compute system 303(1)-303(D) to require maximum data communication interface bandwidth at the same time. For example, data access patterns among the different cloud compute systems 303(1)-303(D) can indicate that each cloud compute system 303(1)-303(D) does not require maximum data communication interface bandwidth at the same time. In these embodiments, the number (N) of PCIe lanes in the PCIe link 307 can be less than the number (D) of cloud compute systems 303(1)-303(D) multiplied by the number (M) of PCIe lanes in each PCIe link 309(1)-309(D). The reduction in the number (N) of PCIe lanes in the PCIe link 307 can provide cost and energy savings.

Figure 6:
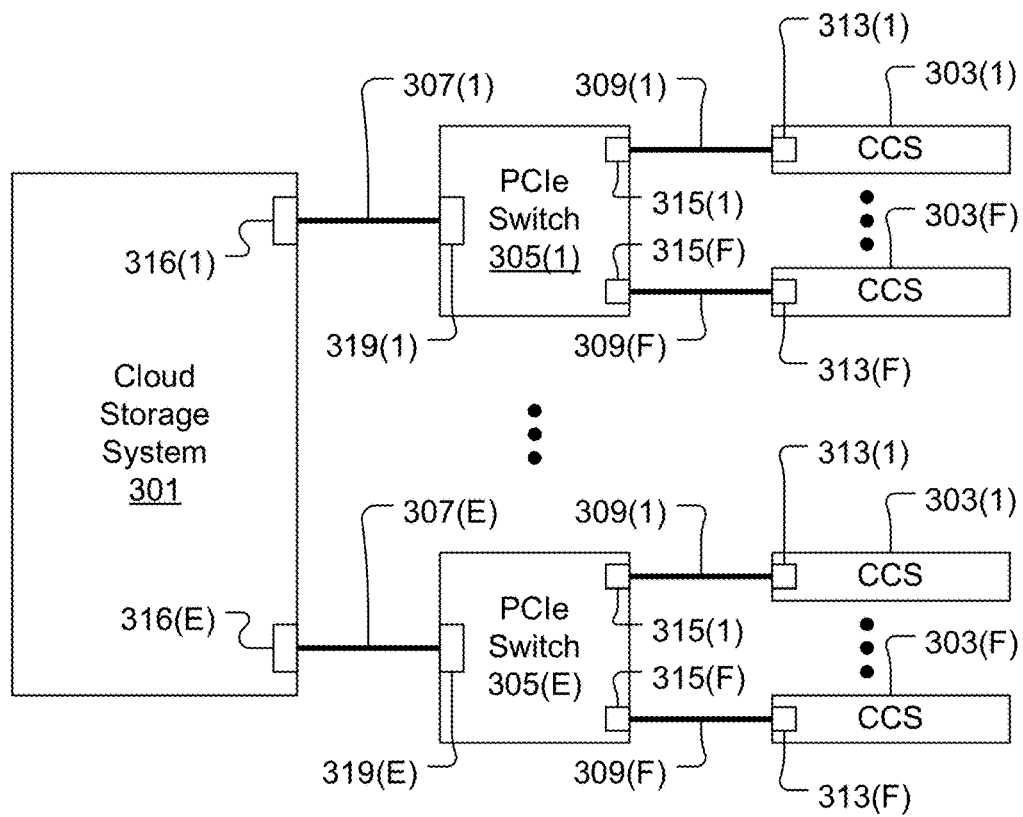
FIG. 6 shows a cloud gaming configuration in which the cloud storage system is connected to a number (E) of PCIe switches, where E is greater than one, through respective PCIe links, in accordance with some embodiments.

In some embodiments, the root complex 317 of the cloud storage system 301 can connect to multiple PCIe switches. For example, FIG. 6 shows a cloud gaming configuration in which the cloud storage system 301 is connected to a number (E) of PCIe switches 305(1)-305(E), where E is greater than one, through respective PCIe links 307(1)-307(E), in accordance with some embodiments. The cloud storage system 301 includes the number (E) of PCIe ports 316(1)-316(E) to which a corresponding one of the number (E) of PCIe links 307(1)-307(E) is connected. Each of the PCIe switches 305(1)-305(E) has a corresponding PCIe port 319(1)-319(E) to which a corresponding one of the number (E) of PCIe links 307(1)-307(E) is connected. Each PCIe switch 305(1)-305(E) has a number (F) of PCIe ports 315(1)-315(F) to which a respective cloud compute system 303(1)-303(F) is connected by way of a corresponding PCIe port 313(1)-313(F) and a corresponding PCIe link 309(1)-309(F). The number (F) of PCIe ports 315(1)-315(F) can vary among the different PCIe switches 305(1)-305(E).

In some embodiments, the PCIe switches 305(1)-305(E) are disposed within the cloud storage system 301. In some embodiments, the PCIe switches 305(1)-305(E) are disposed within the PCIe fabric at a location between the cloud storage system 301 and the various cloud compute systems 303(1)-303(F). The configuration of FIG. 6 may be particularly useful when a single PCIe switch 305(1)-305(E) does not provide enough data communication interface bandwidth (PCIe lanes) to support the aggregation of downstream cloud compute systems 303(1)-303(E*F). Also, the configuration of FIG. 6 provides a level of redundancy in the PCIe fabric. For example, use of multiple PCIe switches 305(1)-305(E) reduce failure domains, such that if one (or even more) PCIe switch(es) 305(1)-305(E) fail within a given cloud storage system 301, only a small amount of data communication interface bandwidth capacity of the cloud storage system 301 is lost.

In various situations, it is possible that one or more of the cloud compute systems 303(1)-303(E*F) could fail, and/or one or more of their corresponding PCIe links 309(1)-309(E*F) could fail, and/or one or more of the PCIe switches 305(1)-305(E) could fail. These various modes of failure can be detected and handled. For example, the PCIe switches 305(1)-305(E) and/or the cloud compute systems 303(1)-303(E*F) and/or the cloud storage system 301 can be configured to detect when a given one of the PCIe links 309(1)-309(E*F) fails, such as by timing out of an I/O request. When such a failure is detected, an attempt can be made to re-establish the given one of the PCIe links 309(1)-309(E*F) that failed. If the given one of the PCIe links 309(1)-309(E*F) that failed cannot be re-established, a corresponding active cloud gaming session may need to be terminated. In this instance, an error is reported to an appropriate software component to terminate the cloud gaming session. Then, at an appropriate time, such as at reboot of the system, the given one of the PCIe links 309(1)-309(E*F) that failed can be checked and verified. Also, when the given one of the PCIe links 309(1)-309(E*F) that failed cannot be re-established, the corresponding one of the cloud compute systems 303(1)-303(E*F) can be reported as "offline" so that user's will not assigned to it.

Figure 7:
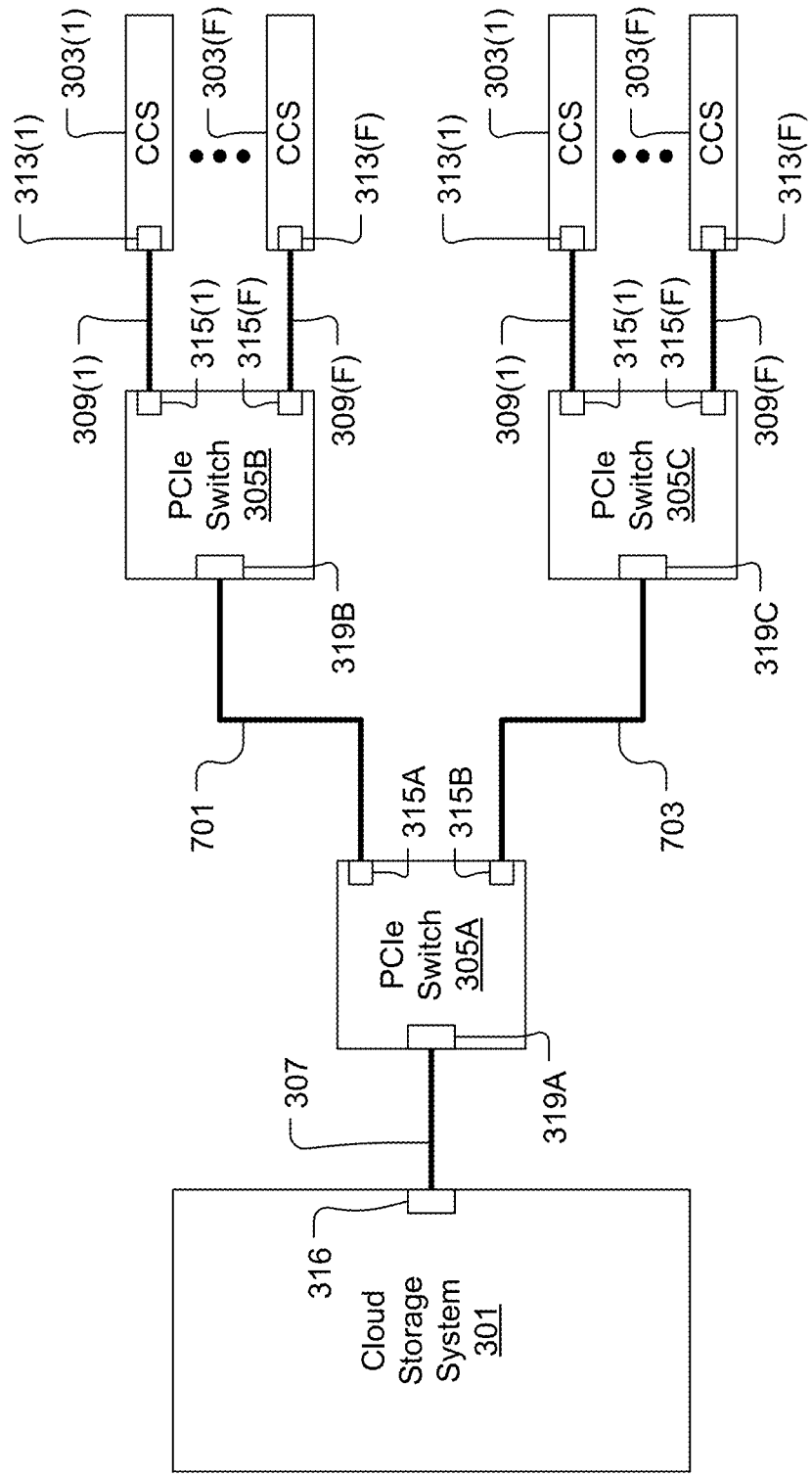
FIG. 7 shows a cloud gaming configuration in which the cloud storage system is connected to multiple cloud compute systems through a fanout configuration of PCIe switches, in accordance with some embodiments.

In some embodiments, the PCIe fabric that connects the cloud compute system(s) 303 to the cloud storage system 301 can include a fanout configuration of multiple PCIe switches 305. For example, FIG. 7 shows a cloud gaming configuration in which the cloud storage system 301 is connected to multiple cloud compute systems 303 through a fanout configuration of PCIe switches 305A, 305B, 305C, in accordance with some embodiments. The PCIe port 316 of the cloud storage system 301 is connected to a PCIe port 319A of the PCIe switch 305A through the PCIe link 307. A PCIe port 315A of the PCIe switch 305A is connected to a PCIe port 319B of the PCIe switch 305B through a PCIe link 701. A PCIe port 315B of the PCIe switch 305A is connected to a PCIe port 319C of the PCIe switch 305C through a PCIe link 703. The PCIe switch 305B has a number (F) of PCIe ports 315(1)-315(F) to which a respective cloud compute system 303(1)-303(F) is connected by way of a corresponding PCIe port 313(1)-313(F) and a corresponding PCIe link 309(1)-309(F). The PCIe switch 305C has a number (F) of PCIe ports 315(1)-315(F) to which a respective cloud compute system 303(1)-303(F) is connected by way of a corresponding PCIe port 313(1)-313(F) and a corresponding PCIe link 309(1)-309(F). The number (F) of PCIe ports 315(1)-315(F) can vary for the different PCIe switches 305B and 305C. Also, while the example of FIG. 7 shows three PCIe switches 305A, 305B, 305C in the fanout configuration, it should be understood that other embodiments can include more than three PCIe switches 305 in the fanout configuration, and can include more than two PCIe switches 305 connected to downstream PCIe ports 315 of a given PCIe switch 305.

The fanout configuration of multiple PCIe switches 305 may be particularly useful when a single PCIe switch 305 does not provide enough data communication interface bandwidth (PCIe lanes) to support the aggregation of downstream cloud compute systems 303. Also, the fanout configuration of multiple PCIe switches 305 may be particularly useful when multiple cloud compute systems 303 require maximum data communication interface bandwidth (PCIe lanes) at the same time and/or all of the time. Also, the fanout configuration of multiple PCIe switches 305 provides for improved signal integrity through the PCIe fabric. For example, the PCIe specification has a maximum length for electrical traces on circuit boards or in cables. And, the maximum length for electrical traces depends on the generation of the PCIe technology that is utilized. The PCIe specification defines a certain amount of signal loss, which is about 26 dB for PCIe 4.0. This signal loss budget is across an entire signal path, e.g., across I/O pins of chips, connectors, traces/cables, etc., that constitute the entire signal path. In a practical system that implements PCIe 4.0, the maximum length for the entire signal path is about one meter. However, if care is taken and very high quality materials are used, the maximum length for the entire signal path can be up to 4 meters. Because each PCIe switch 305 regenerates signals traveling through the PCIe fabric, use of the fanout configuration of multiple PCIe switches 305 provides a way to increase the overall electrical trace distance over which signals can be transmitted through the PCIe fabric. In some embodiments, increasing the overall electrical trace distance over which signals can be transmitted through the PCIe fabric can be achieved using special logic to regenerate and/or boost signals at various points within the PCIe fabric between the cloud storage system 301 and any one or more of the cloud compute system(s) 303.

While the examples of FIGS. 3A, 3B, 5, 6, and 7 show a PCIe fabric that includes the cloud storage system 301, a number PCIe switches 305, a number of client compute systems 303, and associated PCIe links, it should be understood that the PCIe fabric in various embodiments can also include other PCIe compatible devices, such as GPU's, network adapters, NVMe storage devices, and/or essentially any other PCIe compatible device, with each PCIe compatible device connected to an assigned PCIe switch through an appropriately sized PCIe link. Any given PCIe compatible device within the PCIe fabric can be assigned to a given cloud compute system 303 at system startup through configuration of the PCIe fabric. In general, a system hardware configuration is fixed at system startup. However, in some instances, PCIe hotplug can be used, such as to hotplug an NVMe SSD U.2, 2.5" form factor device, by way of example. In this manner, PCIe hotplug is similar to cabled PCI Express. In some embodiments, the root complex is configured to recognize the hotplug connection of a new PCIe device and notify the operating system, with the operating system in turn assigning a memory address space for use by the new PCIe device. Also, in various embodiments, one or more PCIe compatible devices with the PCIe fabric can be shared among multiple cloud compute systems 303 within the PCIe fabric. Such sharing of a PCIe compatible device by multiple cloud compute systems 303 within the PCIe fabric can be possible if the PCIe compatible device supports a standard such as Single Root Input/Output Virtualization (SR-IOV), which is a specification that provides for sharing of a single PCIe device within a PCIe fabric by way of virtual slicing of the PCIe compatible device into virtual functions. For example, use of SR-IOV to enable sharing of a single PCIe device within a PCIe fabric is particularly useful for network adapters, NVMe devices, and even some GPU's.

Figure 8:
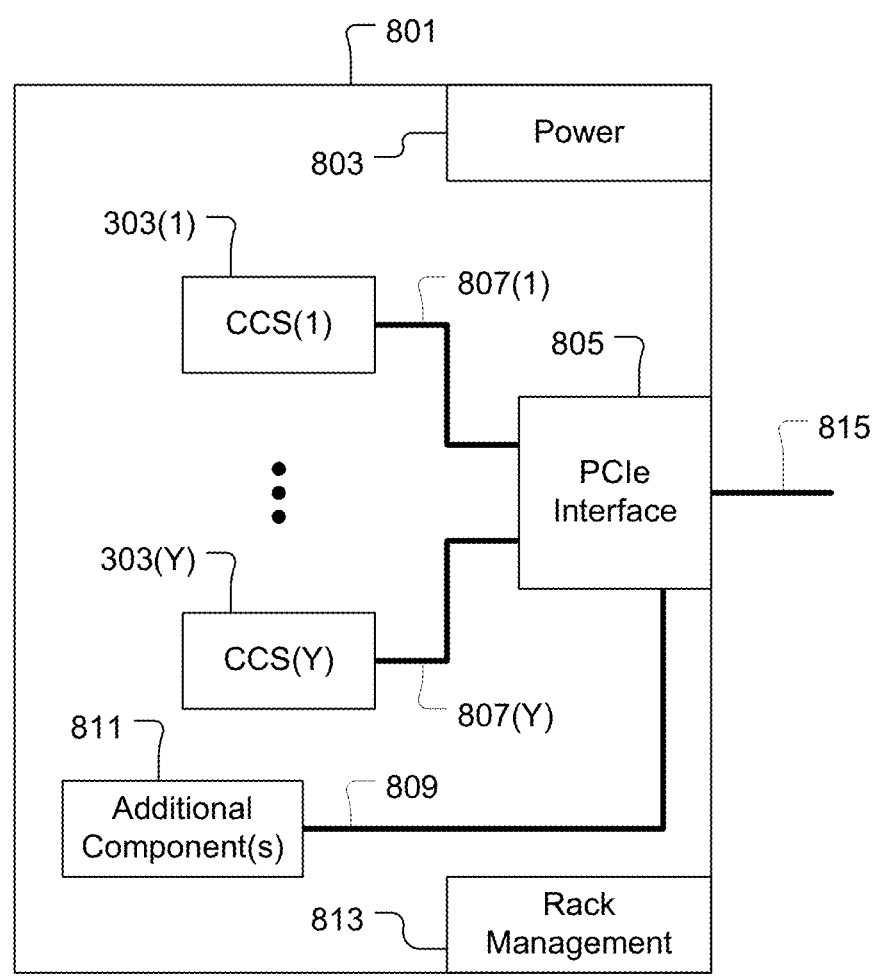
FIG. 8 shows an example compute sled, in accordance with some embodiments.

A compute for cloud gaming can be organized in compute sleds, with each compute sled including one or more independent cloud compute systems 303, a power delivery system, a rack management interface, a PCIe interface, and optional network connectivity. FIG. 8 shows an example compute sled 801, in accordance with some embodiments. The compute sled 801 includes a number (Y) of cloud compute systems 303(1)-303(Y), where (Y) is one or more. The compute sled also includes a PCIe interface 805 and the number (Y) of PCIe links 807(1)-807(Y) that connect the cloud compute systems 303(1)-303(Y) to the PCIe interface 805. The PCIe interface 805 is configured to connect the compute sled 801 to an external PCIe link 815. The compute sled 801 also includes a power delivery system 803 that is connected to deliver electrical power to all electrically powered components on the compute sled 801. The power delivery system 803 is configured to receive electrical power from a source external to the compute sled 801. For example, in some embodiments, the power delivery system 803 is configured to connect to a power rail. In some embodiments, the power delivery system 803 includes a power supply. The compute sled 801 also includes a rack management interface 813, such as a universal serial bus (USB), a universal asynchronous receiver-transmitter (UART) controller, an inter-integrated circuit (I2C) system, among others. The compute sled 801 can also include one or more additional components 811, any of which can have a PCIe interface connected to the PCIe interface 805 of the compute sled 801 by a corresponding PCIe link 809. Also, in some embodiments, the compute sled 801 can optionally include network connectivity, such as to the compute sled 801 and/or to an Ethernet connection, and/or to the cloud compute systems 303(1)-303(Y).

In some embodiments, each cloud compute system 303(1)-303(Y) on the compute sled 801 is an independent system that includes devices and connectivity such as described with regard to the example of FIG. 3B. In some embodiments, each cloud compute system 303(1)-303(Y) includes a PCIe interface that is connected to the PCIe interface 805 of the compute sled 801. In some embodiments, the PCIe interface on each cloud compute system 303(1)-303(Y) is a PCIe slot and/or an M2 interface and/or an OCuLink connector and/or another type of interface capable of carrying PCIe signals and interfacing with the PCIe fabric (or equivalent fabric).

In some embodiments, the PCIe interface 805 in the compute sled 801 is a board to which each cloud compute system 303(1)-303(Y) connects. The board of the PCIe interface 805 is configured to collect PCIe signals from each cloud compute system 303(1)-303(Y) and expose a connector at the exterior, e.g., back, of the compute sled 801. The connector exposed at the exterior of the compute sled 801 can connect to a backplane of a rack, where the backplane connects multiple compute sleds 801 to the cloud storage system 301. In some embodiments, the connector exposed at the exterior of the compute sled 801 can provide for cable (wired) connections between the compute sled 801 and the cloud storage system 301. In some embodiments, the PCIe interface 805 of the compute sled 801 can include electronic components, such as a component to boost signal integrity and/or PCIe switches and PCIe links to implement a fanout configuration of multiple PCIe switches as described with regard to FIG. 7. In some embodiments, the PCIe interface 805 includes auxiliary PCIe devices, such as UART controllers, temperature sensors, general purpose input/output device (GPIO) components, and/or other components to enable management of the compute sled 801. Also, various devices/components within the PCIe interface 805 can be available for use by a cloud compute system 303(1)-303(Y) and/or by another management server for compute sled 801 operation purposes, such as to power on a particular cloud compute system 303(1)-303(Y). Such a management server can be configured to manage one or more compute sleds 801, array of compute sleds 801, or an entire rack of compute sleds 801. In some embodiments, the cloud storage system 301 can function as the management server. In some embodiments, the management server is different from the cloud storage system 301.

Figure 9:
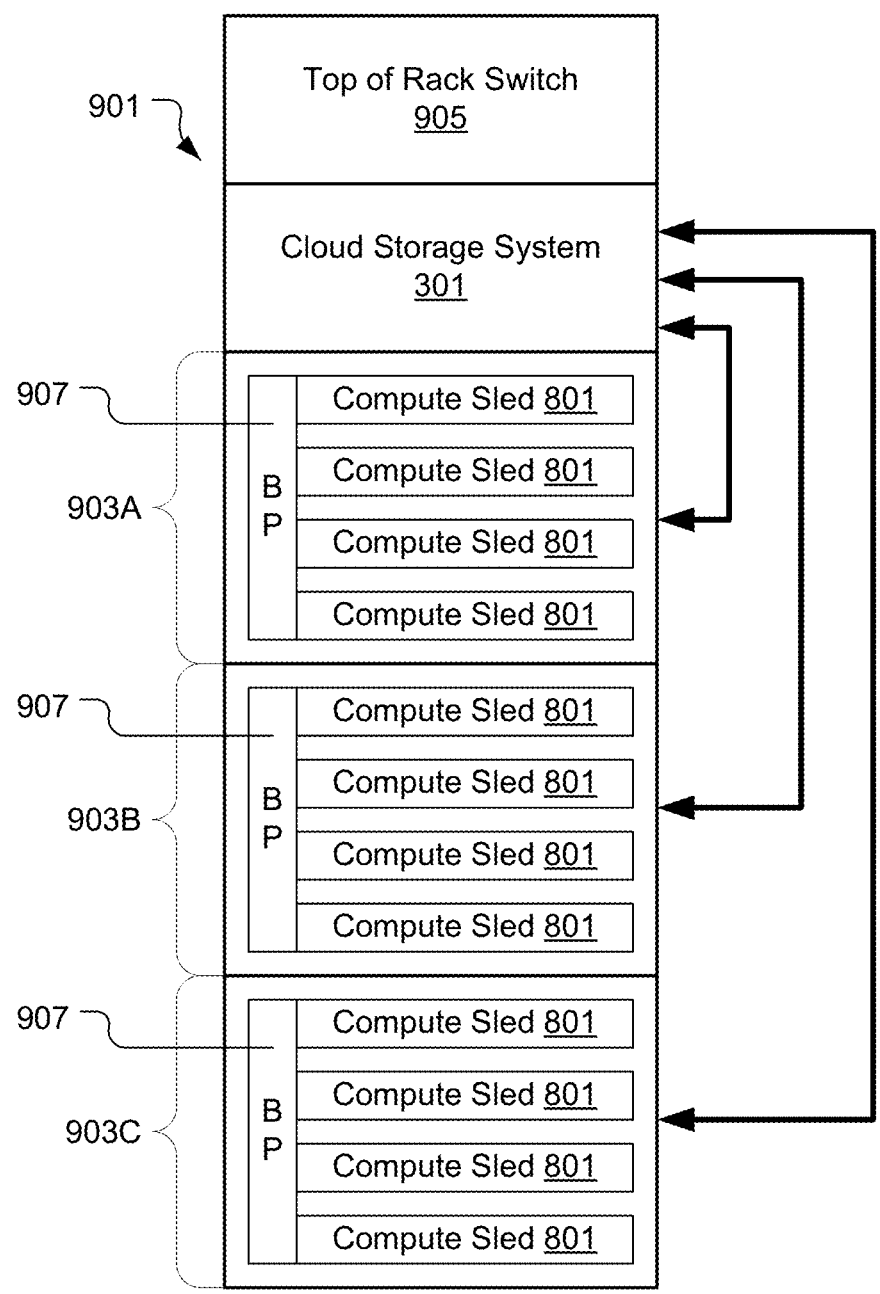
FIG. 9 shows an example diagram of a rack that can be implemented within a cloud gaming center, in accordance with some embodiments.

FIG. 9 shows an example diagram of a rack 901 that can be implemented within a cloud gaming center, in accordance with some embodiments. The rack 901 includes a top of rack switch 905 to enable connectivity of components within the rack 901 to an external network, such as to the Internet. In some embodiments, the rack 901 includes multiple compute arrays 903A, 903B, 903C. Each compute array 903A, 903B, 903C includes multiple compute sleds 801. The rack 901 also includes the cloud storage system 301. Each compute array 903A, 903B, 903C is connected to the cloud storage system 301 over the PCIe fabric. In some embodiments, a given compute array 903A, 903B, 903C includes a backplane 907 into which the PCIe interfaces 805 of the various compute sleds 801 connect. In some embodiments, the backplane 907 of a given compute array 903A, 903B, 903C can include a PCIe switch or other electronic component(s) to boost signal integrity. In some embodiments, the backplane 907 of a given compute array 903A, 903B, 903C can connect to the cloud server system 301 through a cable, such as an OCuLink cable, or other type of connection device that is compatible with the PCIe fabric. In some embodiments, the backplane 907 of a given compute array 903A, 903B, 903C can be configured to provide a maximum amount of PCIe bandwidth required by the aggregation of compute sleds 801 within the given compute array 903A, 903B, 903C. However, in some embodiments, the backplane 907 of a given compute array 903A, 903B, 903C can be configured to reduce the PCIe bandwidth available to individual compute sleds 801 within the given compute array 903A, 903B, 903C, such as by implementing a fanout configuration of PCIe switches.

It should be understood that the rack 901 configuration shown in FIG. 9 is provided by way of example for purposes of description. In various embodiments, the rack 901 can include essentially any number of compute arrays 903A-903C, with each compute array 903A-903C including essentially any number of compute sleds 801. Also, in various embodiments, the rack 901 can include more than one cloud storage system 301. Also, in some embodiments, the compute sleds 801 in a given rack 901 are connected to just communicate with one or more cloud storage systems 301 within the given rack 901. However, in some embodiments, the compute sleds 801 in a given rack 901 can be connected to communicate with a cloud storage system 301 in one or more additional racks 901. Also, in some embodiments, a cloud storage system 301 in a given rack 901 can be connected to communicate with another cloud storage system 301 in another rack 901. Also, in some embodiments, various components of the cloud storage system 301 can be distributed among multiple racks 901.

Therefore, it should be understood that in some embodiments, the cloud storage system 301 and the cloud compute system 303 can be located in the same rack 901. However, in some embodiments, the cloud storage system 301 and the cloud compute system 303 can be located in different racks 901. Also, in some embodiments, a single rack 901 will include multiple cloud storage systems 301. And, in some embodiments, each of the multiple cloud storage systems 301 can be configured to host different content, e.g., different cloud gaming content, which could be different games in some embodiments. In some embodiments, a given cloud compute system 303 will interact with different ones of the multiple cloud storage systems 301, depending on the game content that is required by the given cloud compute system 303. In some embodiments, the cloud compute system 303 is provided with details on which cloud storage system 301 to communicate with prior to mounting of the cloud compute system 303. In some embodiments, the cloud compute system 303 is configured to maintain a database/list that provides information about which cloud storage systems 301 are available for data access and about the content, e.g., gaming content, that is stored on the various cloud storage systems 301.

In advanced cloud gaming systems, the local data storage solution for the cloud compute system 303 can have very high data throughput and very low latency. In cloud gaming, it is beneficial to virtualize data storage for the cloud compute system 303 because it is generally not possible to have all offered game content stored in data storage that is local to the cloud compute system 303, and because storage of such a large amount of offered game content in data storage that is local to individual cloud compute systems 303 would be unmanageable. For at least these reasons, multiple cloud compute systems 303 share data storage in one or more cloud storage systems 301, which can provide large amounts of data storage capacity. The cloud storage system 301 can store data that is sharable among multiple cloud compute systems 303, such as read-only game content. The cloud storage system 301 can also store other data that is specific to a given cloud compute system 303 and that is not sharable among multiple cloud compute systems 303. The cloud compute system 303 is configured to operate based on the data access speed of its local storage system, e.g., of the NVMe SSD by way of example, which can be very fast. Therefore, the cloud storage system 301 needs to match the local data access speed of the cloud compute system 303 in order to avoid adversely impacting operational performance of the cloud compute system 303. However, data storage devices currently available for use in the cloud storage system 301 in combination with network-based data access latency of the cloud storage system 301 does not provide the cloud compute system 303 with a fast enough data access solution to enable matching of the local data access speed of the cloud compute system 303. Additionally, it is currently not possible to procure an individual server class storage device that can match the data access performance needs of the cloud compute system 303 using conventional cloud gaming rack architectures.

The systems and methods disclosed herein in which the PCIe fabric is used to connect the multiple cloud compute systems 303 to the cloud storage system 301 within the rack 901 of the cloud gaming system enables each cloud compute system 303 to directly access game content stored in the computer memory 323 of the cloud storage system 301 with the same speed and bandwidth as if that game content were stored in the local computer memory 337 of the cloud compute system 303. In the systems and methods disclosed herein, the PCIe switching technology is leveraged to provide the cloud compute system 303 with high-speed access to the computer memory 323 of the cloud storage system 301, where such high-speed access exceeds what is possible using a network card and network switches. Also, the storage CPU 331 of the cloud compute system 303 is configured to efficiently process storage commands, but may not be powerful enough to run an operating system and manage high-speed networking operations that would be required with use of a network card and network switches to orchestrate data communication between the cloud storage system 301 and the cloud compute system 303. However, use of the PCIe switching technology in the systems and methods disclosed herein allows the storage CPU 331 to handle the data communication between the cloud storage system 301 and the cloud compute system 303, which helps offload the main CPU 325 of the cloud compute system 303. In this manner, use of the PCIe fabric to connect the cloud compute system 303 with the cloud storage system 301 provides a relatively natural extension on how the cloud compute system 303 is configured to operate.

As previously discussed, in some embodiments, the cloud compute system 303 includes its own local data storage device(s), such as the SATA-HDD 353, the NVMe SSD 341, and/or other data storage device, such as a SATA-SSD, among others. The local data storage device(s) of the cloud compute system 303 can store a variety of different types of data, such as operating system data (e.g., system libraries, system programs, services, configuration files, fonts, images, audio files, among other types of data), user-specific data (saved game data, user character data, download data, browser bookmarks, pictures, music, videos, among other types of data), and/or game data (data for a given game including executable, libraries, textures, audio files, video, game geometry, among other types of data). Each type of data that is stored locally on the cloud compute system 303 can have different performance requirements and access patterns. For example, operating system data is mostly read-only except for configuration files. And, user-specific data is likely subject to frequent modification. Also, game data is typically read-only. Additionally, any write operations by games result in user-specific data, e.g., saved game data files for storing game progress, among others. In some embodiments, operating system data, user-specific data, and game data is stored on a single storage device. Also, in some embodiments, because the operating system data, user-specific data, and game data have different performance requirements, the operating system data, user-specific data, and game data are stored on different partitions or namespaces within a single storage device. In some embodiments, each partition within the storage device may use a different file system, such as FAT32, exFAT, NTFS, UFS, EXT4, among others.

At startup of the cloud compute system 303, the operating system of the cloud compute system 303 enumerates the storage devices that are visible to the cloud compute system 303 and mounts any partition needed using the file system required by the partition. Most data that is available to the cloud compute system 303 is mounted at startup of the cloud compute system 303. However, other mount operations may occur during operation of the cloud compute system 303. For example, a user may insert an additional data storage medium, such as a DVD, Blu-Ray disc, USB key, and/or portable hard drive, among others. Also, in some embodiments, data itself that is stored on the local data storage device of the cloud compute system 303 may require mounting prior to use. For example, game content may be organized in a game package format that includes game data and a game executable. In this example, prior to starting the game, it may be necessary to mount the game package so that any required digital rights management (DRM) can be applied to decrypt any data as needed.

In the context of the cloud compute system 303, performance (accessing and processing) of the game data is most critical, as it greatly affects game load times and user experience. In some embodiments, special file systems and file API's (application programming interfaces) are used for game data, with other data types (operating system data and/or user-specific data) using traditional file systems and traditional file API's, such as those specified by POSIX (Portable Operating System Interface) or Win32 (32-bit API for WINDOWS 95 and later). In particular, when using high-speed NVMe devices, there is great overhead in traditional POSIX and Win32 API's due to the API's being very complex and requiring large amounts of CPU side-processing, which is not optimal for game data performance and latency reasons. In some embodiments, an example of a specialized game-specific API for reading and writing files might look like:

readFile (uint32_t id, void *buffer, size_t size, size_t offset)
writeFile (uint32_t id, void *buffer, size_t size, size_t offset)

In this context, "id" is an identifier for a file. In a traditional operating system, a file identifier is obtained by a matching "open" API call, which maps a "file path" to an identifier, where the specifics on how this works depends on the operating system and file system. This may also be done in a different manner. For example, in the cloud compute system 303, data may be organized in a game package (such as an ISO-file, ISO-image, or other format), this game package can include a mapping table of file names to file identifiers. For example, FIG. 10 shows an example of a mapping table that maps file names to file identifiers, in accordance with some embodiments. In some embodiments, an API call can be used by the application to perform file identifier mapping using a mapping table, such as shown in FIG. 10, by way of example.

A buffer is a block of memory, which holds data that is to be read or written. In the example of the specialized game-specific API for reading and writing files as shown above, "size" is the amount of data that is to be read or written. The buffer needs to have a data storage capacity that can accommodate the "size," i.e., amount, of data that is to be read or written, at a minimum. In the example of the specialized game-specific API for reading and writing files as shown above, "offset" is the location in memory relative to the start of the file at which the to-be-read data is located/begins. The offset is often zero, but a non-zero value can be used to read data from a location in the file that is some distance away from the beginning of the file.

In some embodiments, the game-specific API for reading and writing files (readFile/writeFile) maps to a command buffer. The command buffer is a data structure containing at least the parameters passed to the readFile/writeFile API call, in addition to other internal data structures. The "void *buffer," as provided by the application, is usually a virtual memory address local to the application. In some embodiments, the command buffer requires a physical memory address, which in turn requires conversion between virtual memory addresses and physical memory addresses. In some embodiments, this conversion between virtual and physical memory addresses is done by the operating system kernel. This conversion capability allows other processes or co-processors in the cloud compute system 303, such as the storage CPU 331 among others, to reach the memory buffers.

In some embodiments, the command buffer is placed on a command queue for handling by the operating system of the cloud compute system 303 running on the main CPU 325. In some embodiments, the command buffer is sent to the storage CPU 331, such as by way of the computer memory 337 that is shared by both the main CPU 325 and the storage CPU 331. In some embodiments, the storage CPU 331 functions to manage storage input/output requests, which provides for offloading of the storage input/output requests from the main CPU 325. Because high-performance storage request processing is very demanding in terms of interrupts, use of the storage CPU 331 can reduce interrupts handled by the main CPU 325 and correspondingly improve processing performance of the main CPU 325. Also, because the storage CPU 331 is fairly isolated from the main CPU 325, handling of storage input/output requests by the storage CPU 331 can improve data security to an extent, with the understanding that the storage CPU 331 can access the computer memory 337 and that it is possible to send messages between systems, such as by using doorbell registers.

In some embodiments, the systems and methods disclosed herein (in which the PCIe fabric is used to connect the cloud compute system 303 to the cloud storage system 301) include use of the storage CPU 331 and its command buffer processing to enable direct data access between the cloud compute system 303 and the cloud storage system 301. In the cloud compute system 303, the file identifier is used as a key/index into a file system table, e.g., FIG. 10, to look up metadata for the file. In some embodiments, the metadata for the file includes a location of the file in memory, such as on an HDD or SSD. The location of the file in memory as specified in the metadata can also include an offset at which data is to be read, such as a Logical Block Addressing (LBA) sector on the HDD or SSD, or an offset relative to a game package. The metadata for the file can also include the size of the file and other optional metadata, such as metadata for compression or encryption purposes.

The metadata for the file is used by the cloud compute system 303 to perform a DMA operation to the storage device to retrieve/store the data identified by the command buffer. Upon completion of the DMA operation, as signified by an interrupt from the DMA controller 363, the storage CPU 331 notifies the main CPU 325 and delivers a result back to the application. In some embodiments, other operations after retrieving data from the storage device may include decompression and decryption of the data, as managed by the storage CPU 331 through other co-processors such as the decompression/compression engine 335.

While the game-specific API for reading and writing files (readFile/writeFile) as discussed above is used for specialized game API's, the conventional POSIX and/or Win32 API's can be used by the cloud compute system 303 for other data types, and these conventional API's can map to a command buffer of a different type. Generally speaking, the overall data path is expected to differ with more processing and handling the by the operating system. However, the final data access request may still pass through the storage CPU 331.

In some cloud gaming implementations, in accordance with the embodiments disclosed herein, the cloud compute system 303 may not have its own local data storage, such as HDD and/or SSD. Or, the cloud compute system 303 may have a minimal local data storage device for storing parts of the operating system. It should be understood that in these embodiments, the PCIe fabric that connects the cloud compute system 303 with the cloud storage system 301 can be leveraged to extend handling of the command buffers by the storage CPU 331 of the cloud compute system 303. In some cases, a command buffer that directs access of data stored at a location within the cloud storage system 301 can be processed by the cloud storage system 301. Alternatively, in some cases, a command buffer that directs access of data stored at a location within the cloud storage system 301 can be managed by the cloud storage system 301, with bypassing of the CPU 365 in the cloud storage system 301.

Various embodiments are described as follows in which the command buffer that directs access of data stored at a location within the cloud storage system 301 is processed by the cloud storage system 301. In these embodiments, the CPU 365 of the cloud storage system 301 receives the command buffer from the cloud compute system 303, where the command buffer includes the information on which data to read or write. The command buffer is originally generated by a readFile or writeFile operation. In some embodiments, the command buffer is passed to and handled by the storage CPU 331 of the cloud compute system 303. The command buffer is a data structure that includes information specifying which data is to be read or written. In these embodiments, instead of the storage CPU 331 accessing local storage on the cloud compute system 303, the storage CPU 331 interacts with the cloud storage system 301 through the PCIe fabric.

Several example embodiments for a data read operation are described below in which the command buffer that directs reading of data stored at a location within the cloud storage system 301 is processed by the cloud storage system 301. The example embodiments vary with regard to how the command buffer is transferred to the cloud storage system 301, and with regard to how the requested data is transferred to the cloud compute system 303. The process of exchanging the command buffer between the cloud compute system 303 and the cloud storage server 301 is referred to as the control path. The process of exchanging the data between cloud storage system 301 and the cloud compute system 303 is referred to as the data path. Each of the example embodiments described below represents a different combination of control path and data path. In some cases, it is possible for both the control path and the data path to be offloaded to specialized hardware. However, this may be difficult in some situations. Therefore, in some cases, a CPU, such as the storage CPU 331, handles the control path which is typically a limited amount of work, and the data path is offloaded from the CPU for handling by specialized hardware, such as the DMA controller 339 or other specialized hardware.

For ease of discussion, the example embodiments are described below with regard to handling of a single command buffer. However, it should be understood that in practice the cloud storage server 301 is tasked with handling of multiple command buffers at a time, where these multiple command buffers may come from the same cloud compute system 303 or from different cloud compute systems 303. Therefore, in some embodiments, the cloud storage system 301 implements a queuing mechanism for handling the incoming command buffers. Also, in some embodiments, the queuing mechanism implemented by the cloud storage system 301 includes multiple command buffer queues per cloud compute system 303. In these embodiments, different command buffer queues can be assigned different levels of priority for processing, such that higher priority command buffers go into higher priority command buffer queues. Also, the example embodiments discussed below primarily concern game content read-only data access command buffers, such as those generated by the game-specific API for reading and writing files (readFile/writeFile) as discussed above. However, it should be understood that the principles of the example embodiments discussed below can also be used for reading and writing of other data types, such as operating system data and/or user-specific data, which may use more conventional POSIX and/or Win32 API's and correspondingly adjusted command buffers. For example, a read or write operation using a conventional POSIX API would be similar to a specialized game read operation with some adjustment to get the write command buffer data from the cloud compute system 303 to the cloud storage system 301.

In a first example embodiment, the command buffer is transferred to the cloud storage system 301 by the cloud compute system 303 operating to write the command buffer to the computer memory 323 of the cloud storage system 301, by way of the PCIe fabric. The cloud storage server 301 executes the command buffer to read the requested data from a data storage device accessible by the cloud storage server 301. The requested data is transferred to the cloud compute system 303 by the cloud compute system 303 operating to read the requested data from the computer memory 323 of the cloud storage system 301, by way of the PCIe fabric.

In the first example embodiment, the cloud compute system 303 generates a command buffer to read data from the cloud storage system 301. The data to be read is referred to as requested data. The cloud compute system 303 writes the command buffer to the computer memory 323 on the cloud storage system 301. The cloud compute system 303 notifies the cloud storage system 301 of the command buffer arrival in the computer memory 323 of the cloud storage system 301. In some embodiments, this notification of arrival of the command buffer in the computer memory 323 of the cloud storage system 301 is done by the cloud compute system 303 writing to a doorbell register or sending a message to the cloud storage system 301. The doorbell register can be at any memory location that is monitored by the cloud storage system 301. For example, the doorbell register can be in the computer memory 323 of the cloud storage system 301 or in the PCIe switch 305, or even in the computer memory 337 of the cloud compute system 303 by way of the PCIe fabric. Notification of arrival of the command buffer in the computer memory 323 of the cloud storage system 301 causes an interrupt to fire on the cloud storage system 301.

In response to the interrupt, the cloud storage system 301 reads the command buffer from the computer memory 323 of the cloud storage system 301, and processes the command buffer to obtain the requested data from a data storage device that is accessible by the cloud storage system 301. The cloud storage system 301 writes the requested data into the computer memory 323 of the cloud storage system 301. The cloud storage system 301 then notifies the cloud compute system 303 that the requested data is available in computer memory 323 of the cloud storage system 301 and where the requested data is located in the computer memory 323 of the cloud storage system 301. In some embodiments, this notification of the availability of the requested data in the computer memory 323 of the cloud storage system 301 is done by the cloud storage system 301 writing to a doorbell register or sending a message to the cloud compute system 303. The doorbell register can be at any memory location that is monitored by the cloud compute system 303. For example, the doorbell register can be in the computer memory 337 of the cloud compute system 303 or in the PCIe switch 305, or even in the computer memory 323 of the cloud storage system 301 by way of the PCIe fabric. Also, in some embodiments, doorbell registers are actual registers in hardware dedicated for this purpose, such as hardware registers in SRAM/flipflops.

In response to the notification of the availability of the requested data in the computer memory 323 of the cloud storage system 301, the cloud compute system 303 reads the requested data from computer memory 323 on cloud storage system 301. In some embodiments, a memory address returned by the cloud storage system 301 is used by the cloud compute system 303 to read the requested data from computer memory 323 on cloud storage system 301. In some embodiments, a pre-assigned fixed memory address in the computer memory 323 on cloud storage system 301 is dedicated to the cloud compute system 303, and is known by the cloud compute system 303 to be the memory address at which the requested data is available for reading. In some embodiments, the storage CPU 331 on the cloud compute system 303 directly reads the requested data from the computer memory 323 on the cloud storage system 301 by way of the PCIe fabric.

In some embodiments, the storage CPU 331 on the cloud compute system 303 directs a DMA engine to read the requested data from the computer memory 323 on the cloud storage system 301 by way of the PCIe fabric. In various embodiments, the DMA engine can be implemented within the cloud compute system 303, e.g., the DMA controller 339, or within the PCIe switch 305, or within another component that is accessible by the cloud compute system 303 through the PCIe fabric. Use of the DMA engine to read the requested data from the computer memory 323 on the cloud storage system 301 can be done to assist with off-loading the storage CPU 331 of the cloud compute system 303.

Figure 11:
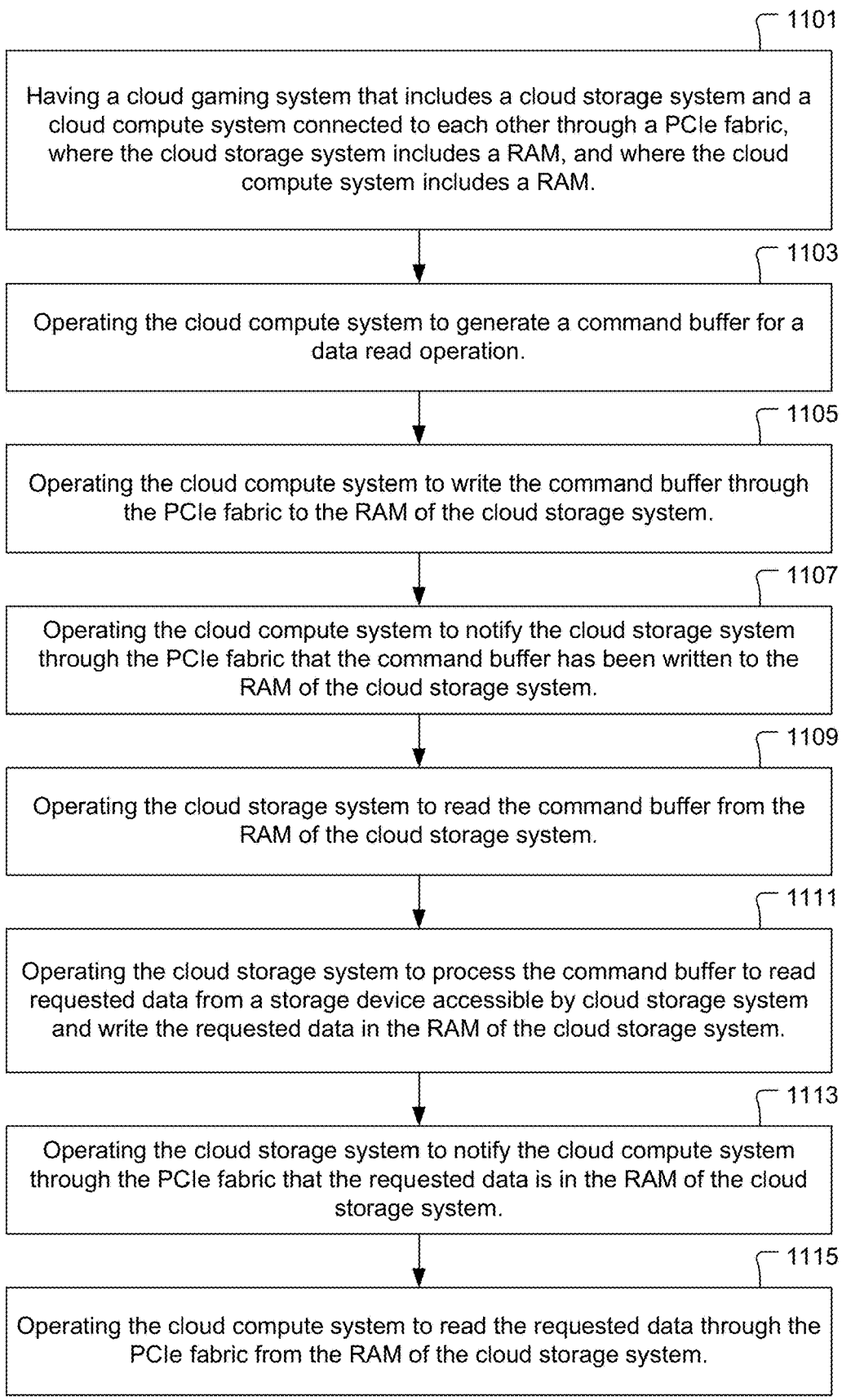
FIG. 11 shows a method for requesting and transferring data in a cloud gaming system that includes the cloud storage system connected to the cloud compute system by way of the PCIe fabric, in accordance with some embodiments.

FIG. 11 shows a method for requesting and transferring data in a cloud gaming system that includes the cloud storage system 301 connected to the cloud compute system 303 by way of the PCIe fabric, in accordance with some embodiments. The method includes an operation 1101 for having a cloud gaming system that including the cloud storage system 301 and the cloud compute system 303 connected to each other through the PCIe fabric. The cloud storage system 301 includes the computer memory 323, and the cloud compute system 303 includes the computer memory 337. The PCIe fabric includes the PCIe switch 305 connected to a PCIe interface of the cloud storage system 301 and to a PCIe interface of the cloud compute system 303. The method includes an operation 1103 in which the cloud compute system 303 operates to generate a command buffer for a data read operation. The method includes an operation 1105 in which the cloud compute system 303 operates to write the command buffer through the PCIe fabric to the computer memory 323 of the cloud storage system 301. The method includes an operation 1107 in which the cloud compute system 303 operates to notify the cloud storage system 301 through the PCIe fabric that the command buffer has been written to the computer memory 323 of the cloud storage system 301. In some embodiments, the operation 1107 includes operating the cloud compute system 303 to write to a doorbell register that is exposed through the PCIe switch 305, with the doorbell register being monitored by the cloud storage system 301.

The method includes an operation 1109 in which the cloud storage system 301 operates to read the command buffer from the computer memory 323 of the cloud storage system 301. The method includes an operation 1111 in which the cloud storage system 301 operates to process the command buffer to read requested data from a storage device accessible by cloud storage system 301 and write the requested data in the computer memory 323 of the cloud storage system 301. The method includes an operation 1113 in which the cloud storage system 301 operates to notify the cloud compute system 303 through the PCIe fabric that the requested data is in the computer memory 323 of the cloud storage system 301. In some embodiments, the operation 1113 includes operating the cloud storage system 301 to write to a doorbell register that is exposed through the PCIe switch 305, with the doorbell register being monitored by the cloud compute system 303. The method includes an operation 1115 in which the cloud compute system 303 operates to read the requested data through the PCIe fabric from the computer memory 323 of the cloud storage system 301.

In some embodiments of the method of FIG. 11, the PCIe switch 305 includes the NTB 321, and the PCIe interface of the cloud compute system 303 is connected to the PCIe switch 305 through the NTB 321. In some embodiments of the method of FIG. 11, the cloud storage system 301 includes the IOMMU 381, and the PCIe interface of the cloud storage system 301 is connected to the IOMMU 381. In some embodiments of the method of FIG. 11, the PCIe switch 305 includes the NTB 321, and the cloud storage system 301 includes the IOMMU 381, with the PCIe interface of the cloud compute system 303 is connected to the PCIe switch 305 through the NTB 321, and with the PCIe interface of the cloud storage system 301 is connected to the IOMMU 381.

In a second example embodiment, the command buffer is transferred to the cloud storage system 301 by the cloud compute system 303 operating to write the command buffer to the computer memory 323 of the cloud storage system 301, by way of the PCIe fabric. The cloud storage server 301 executes the command buffer to read the requested data from a data storage device accessible by the cloud storage server 301. The requested data is transferred to the cloud compute system 303 by the cloud storage system 301 operating to write the requested data to the computer memory 337 of the cloud compute system 303, by way of the PCIe fabric.

In the second example embodiment, the cloud compute system 303 generates a command buffer to read data from the cloud storage system 301. The data to be read is referred to as requested data. The command buffer specifies a physical memory address in the computer memory 337 of the cloud compute system 303 at which the cloud storage system 301 can write the requested data by way of the PCIe fabric. If the PCIe switch 305 includes the NTB 321, the physical memory address in the computer memory 337 of the cloud compute system 303 that is specified in the command buffer to indicate where the cloud storage system 301 can write the requested data is a translated memory address generated by the NTB 321. In this case, the storage CPU 331 of the cloud compute system 303 operates to modify the original command buffer to include the translated memory address generated by the NTB 321.

The cloud compute system 303 writes the command buffer to the computer memory 323 on the cloud storage system 301, by way of the PCIe fabric. The cloud compute system 303 notifies the cloud storage server 301 of the command buffer arrival in the computer memory 323 of the cloud storage system 301. In some embodiments, this notification of arrival of the command buffer in the computer memory 323 of the cloud storage system 301 is done by the cloud compute system 303 writing to a doorbell register or sending a message to the cloud storage system 301. The doorbell register can be at any memory location that is monitored by the cloud storage system 301. For example, the doorbell register can be in the computer memory 323 of the cloud storage system 301 or in the PCIe switch 305, or even in the computer memory 337 of the cloud compute system 303 by way of the PCIe fabric. Notification of arrival of the command buffer in the computer memory 323 of the cloud storage system 301 causes an interrupt to fire on the cloud storage system 301.

In response to the interrupt, the cloud storage system 301 reads the command buffer from the computer memory 323 of the cloud storage system 301, and processes the command buffer to obtain the requested data from a data storage device that is accessible by the cloud storage system 301. The cloud storage system 301 may optionally write the requested data into the computer memory 323 of the cloud storage system 301. The cloud storage server 301 then writes the requested data to the memory address on the cloud compute system 303 that is specified in the command buffer, by way of the PCIe fabric. In some embodiments, the cloud storage system 301 directly writes the requested data to the computer memory 337 on the cloud compute system 303 by way of the PCIe fabric. In some embodiments, the cloud storage system 301 directs a DMA engine to write the requested data to the computer memory 337 on the cloud compute system 303 by way of the PCIe fabric. In various embodiments, the DMA engine can be implemented within the cloud storage system 301, or within the PCIe switch 305, or within another component that is accessible by the cloud storage system 301 through the PCIe fabric. Use of the DMA engine to write the requested data to the computer memory 337 on the cloud compute system 303 can be done to assist with offloading the CPU 365 of the cloud storage system 301.

The cloud storage system 301 then notifies the cloud compute system 303 that the requested data is available in the computer memory 337 of the cloud compute system 303. In some embodiments, this notification of the availability of the requested data in the computer memory 337 of the cloud compute system 303 is done by the cloud storage system 301 writing to a doorbell register or sending a message to the cloud compute system 303. The doorbell register can be at any memory location that is monitored by the cloud compute system 303. For example, the doorbell register can be in the computer memory 337 of the cloud compute system 303 or in the PCIe switch 305, or even in the computer memory 323 of the cloud storage system 301 by way of the PCIe fabric.

Figure 12:
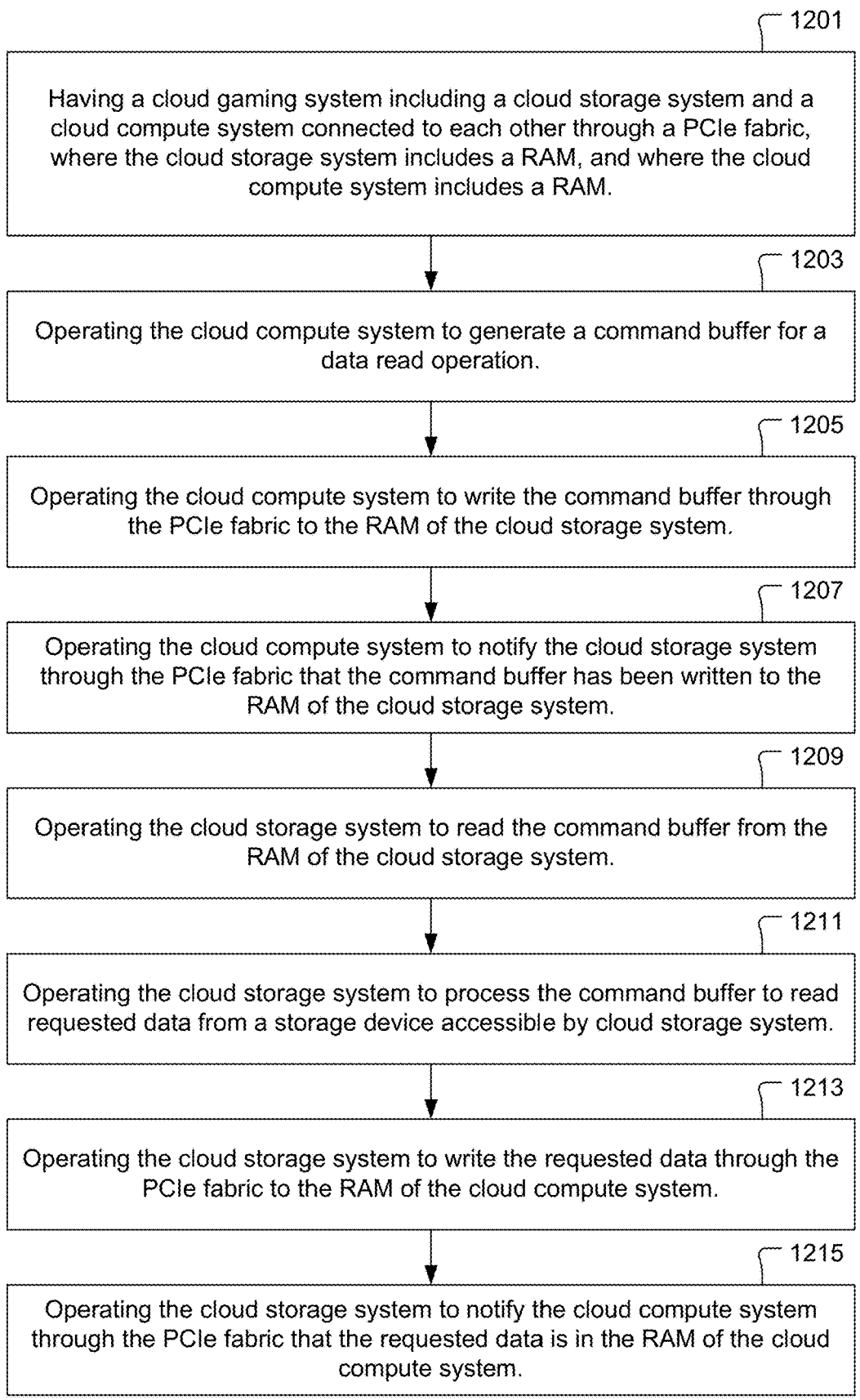
FIG. 12 shows a method for requesting and transferring data in a cloud gaming system that includes the cloud storage system connected to the cloud compute system by way of the PCIe fabric, in accordance with some embodiments.

FIG. 12 shows a method for requesting and transferring data in a cloud gaming system that includes the cloud storage system 301 connected to the cloud compute system 303 by way of the PCIe fabric, in accordance with some embodiments. The method includes an operation 1201 for having a cloud gaming system that includes the cloud storage system 301 and the cloud compute system 303 connected to each other through the PCIe fabric. The cloud storage system 301 includes the computer memory 323, and the cloud compute system 303 includes the computer memory 337. The PCIe fabric includes the PCIe switch 305 connected to a PCIe interface of the cloud storage system 301 and to a PCIe interface of the cloud compute system 303. The method includes an operation 1203 in which the cloud compute system 303 operates to generate a command buffer for a data read operation. The method also includes an operation 1205 in which the cloud compute system 303 operates to write the command buffer through the PCIe fabric to the computer memory 323 of the cloud storage system 301. The method also includes an operation 1207 in which the cloud compute system 303 operates to notify the cloud storage system 301 through the PCIe fabric that the command buffer has been written to the computer memory 323 of the cloud storage system 301. In some embodiments, the operation 1207 includes operating the cloud compute system 303 to write to a doorbell register that is exposed through the PCIe switch 305, with the doorbell register being monitored by the cloud storage system 301.

The method also includes an operation 1209 in which the cloud storage system 301 operates to read the command buffer from the computer memory 323 of the cloud storage system 301. The method also includes an operation 1211 in which the cloud storage system 301 operates to process the command buffer to read requested data from a storage device accessible by cloud storage system 301. The method also includes an operation 1213 in which the cloud storage system 301 operates to write the requested data through the PCIe fabric to the computer memory 337 of the cloud compute system 303. The method also includes an operation

1215 in which the cloud storage system 301 operates to notify the cloud compute system 303 through the PCIe fabric that the requested data is in the computer memory 337 of the cloud compute system 303. In some embodiments, the operation 1215 includes operating the cloud storage system 301 to write to a doorbell register that is exposed through the PCIe switch 305, with the doorbell register being monitored by the cloud compute system 303.

In some embodiments of the method of FIG. 12, the PCIe switch 305 includes the NTB 321, and the PCIe interface of the cloud compute system 303 is connected to the PCIe switch 305 through the NTB 321. In some embodiments of the method of FIG. 12, the cloud storage system 301 includes the IOMMU 381, and the PCIe interface of the cloud storage system 301 is connected to the IOMMU 381. In some embodiments of the method of FIG. 12, the PCIe switch 305 includes the NTB 321, and the cloud storage system 301 includes the IOMMU 381, with the PCIe interface of the cloud compute system 303 is connected to the PCIe switch 305 through the NTB 321, and with the PCIe interface of the cloud storage system 301 is connected to the IOMMU 381. If the PCIe switch 305 includes the NTB 321, the physical memory address in the computer memory 337 of the cloud compute system 303 that is specified in the command buffer to indicate where the cloud storage system 301 can write the requested data is a translated memory address generated by the NTB 321. In this case, the storage CPU 331 of the cloud compute system 303 operates to modify the original command buffer to include the translated memory address generated by the NTB 321.

In a third example embodiment, the command buffer is transferred to the cloud storage system 301 by the cloud storage server 301 operating to read the command buffer from the computer memory 337 of the cloud compute system 303, by way of the PCIe fabric. The cloud storage server 301 executes the command buffer to read the requested data from a data storage device accessible by the cloud storage server 301. The requested data is transferred to the cloud compute system 303 by the cloud storage system 301 operating to write the requested data to the computer memory 337 of the cloud compute system 303, by way of the PCIe fabric.

In the third example embodiment, the cloud compute system 303 generates a command buffer to read data from the cloud storage system 301. The data to be read is referred to as requested data. The command buffer specifies a physical memory address in the computer memory 337 of the cloud compute system 303 at which the cloud storage system 301 can write the requested data by way of the PCIe fabric. If the PCIe switch 305 includes the NTB 321, the physical memory address in the computer memory 337 of the cloud compute system 303 that is specified in the command buffer to indicate where the cloud storage system 301 can write the requested data is a translated memory address generated by the NTB 321. In this case, the storage CPU 331 of the cloud compute system 303 operates to modify the original command buffer to include the translated memory address generated by the NTB 321.

The cloud compute system 303 writes the command buffer to the computer memory 337 on the cloud compute system 303. The cloud compute system 303 notifies the cloud storage server 301 of the command buffer arrival in the computer memory 337 of the cloud compute system 303. In some embodiments, this notification of arrival of the command buffer in the computer memory 337 of the cloud compute system 303 is done by the cloud compute system 303 writing to a doorbell register or sending a message to the cloud storage system 301. The doorbell register can be at any memory location that is monitored by the cloud storage system 301. For example, the doorbell register can be in the computer memory 323 of the cloud storage system 301 or in the PCIe switch 305, or even in the computer memory 337 of the cloud compute system 303 by way of the PCIe fabric. Notification of arrival of the command buffer in the computer memory 337 of the cloud compute system 303 causes an interrupt to fire on the cloud storage system 301.

In response to the interrupt, the cloud storage system 301 reads the command buffer from the computer memory 337 of the cloud compute system 303, by way of the PCIe fabric, and processes the command buffer to obtain the requested data from a data storage device that is accessible by the cloud storage system 301. The cloud storage system 301 may optionally write the requested data into the computer memory 323 of the cloud storage system 301. The cloud storage system 301 then writes the requested data to the memory address on the cloud compute system 303 that is specified in the command buffer, by way of the PCIe fabric. In some embodiments, the cloud storage system 301 directly writes the requested data to the computer memory 337 on the cloud compute system 303 by way of the PCIe fabric. In some embodiments, the cloud storage system 301 directs a DMA engine to write the requested data to the computer memory 337 on the cloud compute system 303 by way of the PCIe fabric. In various embodiments, the DMA engine can be implemented within the cloud storage system 301, or within the PCIe switch 305, or within another component that is accessible by the cloud storage system 301 through the PCIe fabric. Use of the DMA engine to write the requested data to the computer memory 337 on the cloud compute system 303 can be done to assist with offloading the CPU 365 of the cloud storage system 301.

The cloud storage system 301 then notifies the cloud compute system 303 that the requested data is available in the computer memory 337 of the cloud compute system 303. In some embodiments, this notification of the availability of the requested data in the computer memory 337 of the cloud compute system 303 is done by the cloud storage system 301 writing to a doorbell register or sending a message to the cloud compute system 303. The doorbell register can be at any memory location that is monitored by the cloud compute system 303. For example, the doorbell register can be in the computer memory 337 of the cloud compute system 303 or in the PCIe switch 305, or even in the computer memory 323 of the cloud storage system 301 by way of the PCIe fabric.

Figure 13:
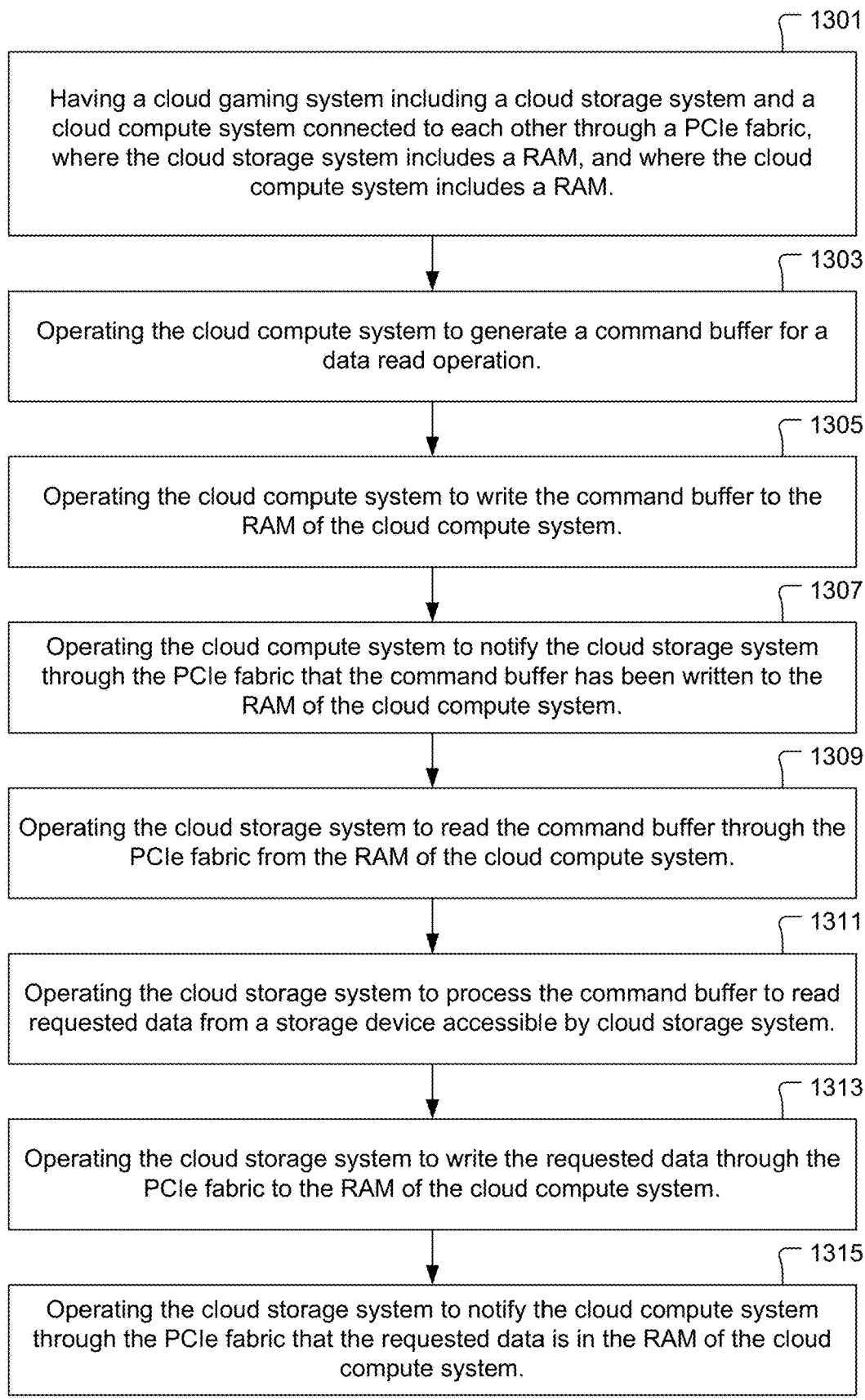
FIG. 13 shows a method for requesting and transferring data in a cloud gaming system that includes the cloud storage system connected to the cloud compute system by way of the PCIe fabric, in accordance with some embodiments.

FIG. 13 shows a method for requesting and transferring data in a cloud gaming system that includes the cloud storage system 301 connected to the cloud compute system 303 by way of the PCIe fabric, in accordance with some embodiments. The method includes an operation 1301 for having a cloud gaming system that includes the cloud storage system 301 and the cloud compute system 303 connected to each other through the PCIe fabric. The cloud storage system 301 includes the computer memory 323, and the cloud compute system 303 includes the computer memory 337. The PCIe fabric includes the PCIe switch 305 connected to a PCIe interface of the cloud storage system 301 and to a PCIe interface of the cloud compute system 303. The method includes an operation 1303 in which the cloud compute system 303 operates to generate a command buffer for a data read operation. The method also includes an operation 1305 in which the cloud compute system 303 operates to write the command buffer to the computer memory 337 of the cloud compute system 303. The method also includes an operation 1307 in which the cloud compute system 303 operates to notify the cloud storage system 301 through the PCIe fabric that the command buffer has been written to the computer memory 337 of the cloud compute system 303. In some embodiments, the operation 1307 includes operating the cloud compute system 303 to write to a doorbell register that is exposed through the PCIe switch 305, with the doorbell register being monitored by the cloud storage system 301.

The method also includes an operation 1309 in which the cloud storage system 301 operates to read the command buffer through the PCIe fabric from the computer memory 323 of the cloud compute system 301. The method also includes an operation 1311 in which the cloud storage system 301 operates to process the command buffer to read requested data from a storage device accessible by cloud storage system 301. The method also includes an operation 1313 in which the cloud storage system 301 operates to write the requested data through the PCIe fabric to the computer memory 337 of the cloud compute system 303. The method also includes an operation 1315 in which the cloud storage system 301 operates to notify the cloud compute system 303 through the PCIe fabric that the requested data is in the computer memory 337 of the cloud compute system 303. In some embodiments, the operation 1315 includes operating the cloud storage system 301 to write to a doorbell register that is exposed through the PCIe switch 305, with the doorbell register being monitored by the cloud compute system 303.

In some embodiments of the method of FIG. 13, the PCIe switch 305 includes the NTB 321, and the PCIe interface of the cloud compute system 303 is connected to the PCIe switch 305 through the NTB 321. In some embodiments of the method of FIG. 13, the cloud storage system 301 includes the IOMMU 381, and the PCIe interface of the cloud storage system 301 is connected to the IOMMU 381. In some embodiments of the method of FIG. 13, the PCIe switch 305 includes the NTB 321, and the cloud storage system 301 includes the IOMMU 381, with the PCIe interface of the cloud compute system 303 is connected to the PCIe switch 305 through the NTB 321, and with the PCIe interface of the cloud storage system 301 is connected to the IOMMU 381. If the PCIe switch 305 includes the NTB 321, the physical memory address in the computer memory 337 of the cloud compute system 303 that is specified in the command buffer to indicate where the cloud storage system 301 can write the requested data is a translated memory address generated by the NTB 321. In this case, the storage CPU 331 of the cloud compute system 303 operates to modify the original command buffer to include the translated memory address generated by the NTB 321.

In a fourth example embodiment, the command buffer is transferred to the cloud storage system 301 by the cloud storage server 301 operating to read the command buffer from the computer memory 337 of the cloud compute system 303, by way of the PCIe fabric. The cloud storage server 301 executes the command buffer to read the requested data from a data storage device accessible by the cloud storage server 301. The requested data is transferred to the cloud compute system 303 by the cloud compute system 303 operating to read the requested data from the computer memory 323 of the cloud storage system 301, by way of the PCIe fabric.

In the fourth example embodiment, the cloud compute system 303 generates a command buffer to read data from the cloud storage system 301. The data to be read is referred to as requested data. The cloud compute system 303 writes the command buffer to the computer memory 337 on the cloud compute system 303. The cloud compute system 303 notifies the cloud storage server 301 of the command buffer arrival in the computer memory 337 of the cloud compute system 303. In some embodiments, this notification of arrival of the command buffer in the computer memory 337 of the cloud compute system 303 is done by the cloud compute system 303 writing to a doorbell register or sending a message to the cloud storage system 301. The doorbell register can be at any memory location that is monitored by the cloud storage system 301. For example, the doorbell register can be in the computer memory 323 of the cloud storage system 301 or in the PCIe switch 305, or even in the computer memory 337 of the cloud compute system 303 by way of the PCIe fabric. Notification of arrival of the command buffer in the computer memory 337 of the cloud compute system 303 causes an interrupt to fire on the cloud storage system 301.

In response to the interrupt, the cloud storage system 301 reads the command buffer from the computer memory 337 of the cloud compute system 303, by way of the PCIe fabric, and processes the command buffer to obtain the requested data from a data storage device that is accessible by the cloud storage system 301. The cloud storage system 301 writes the requested data into the computer memory 323 of the cloud storage system 301. The cloud storage system 301 then notifies the cloud compute system 303 that the requested data is available in computer memory 323 of the cloud storage system 301 and where the requested data is located in the computer memory 323 of the cloud storage system 301. In some embodiments, this notification of the availability of the requested data in the computer memory 323 of the cloud storage system 301 is done by the cloud storage system 301 writing to a doorbell register or sending a message to the cloud compute system 303. The doorbell register can be at any memory location that is monitored by the cloud compute system 303. For example, the doorbell register can be in the computer memory 337 of the cloud compute system 303 or in the PCIe switch 305, or even in the computer memory 323 of the cloud storage system 301 by way of the PCIe fabric.

In response to the notification of the availability of the requested data in the computer memory 323 of the cloud storage system 301, the cloud compute system 303 reads the requested data from computer memory 323 on cloud storage system 301. In some embodiments, a memory address returned by the cloud storage system 301 is used by the cloud compute system 303 to read the requested data from computer memory 323 on cloud storage system 301. In some embodiments, a pre-assigned fixed memory address in the computer memory 323 on cloud storage system 301 is dedicated to the cloud compute system 303, and is known by the cloud compute system 303 to be the memory address at which the requested data is available for reading. In some embodiments, the storage CPU 331 on the cloud compute system 303 directly reads the requested data from the computer memory 323 on the cloud storage system 301 by way of the PCIe fabric. In some embodiments, the storage CPU 331 on the cloud compute system 303 directs a DMA engine to read the requested data from the computer memory 323 on the cloud storage system 301 by way of the PCIe fabric. In various embodiments, the DMA engine can be implemented within the cloud compute system 303, e.g., the DMA controller 339, or within the PCIe switch 305, or within another component that is accessible by the cloud compute system 303 through the PCIe fabric. Use of the DMA engine to read the requested data from the computer memory 323 on the cloud storage system 301 can be done to assist with offloading the storage CPU 331 of the cloud compute system 303.

Figure 14:
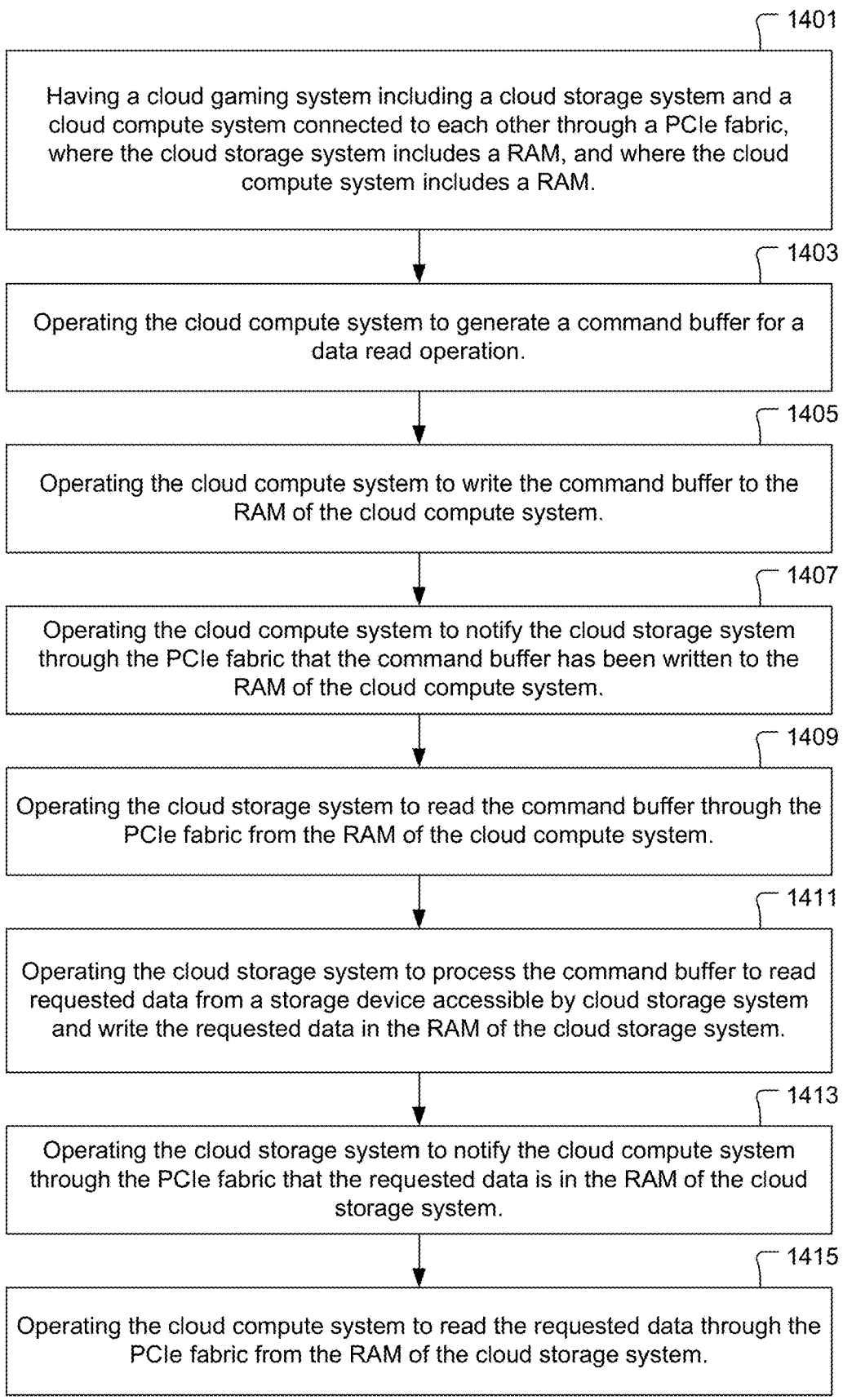
FIG. 14 shows a method for requesting and transferring data in a cloud gaming system that includes the cloud storage system connected to the cloud compute system by way of the PCIe fabric, in accordance with some embodiments.

FIG. 14 shows a method for requesting and transferring data in a cloud gaming system that includes the cloud storage system 301 connected to the cloud compute system 303 by way of the PCIe fabric, in accordance with some embodiments. The method includes an operation 1401 for having a cloud gaming system that includes the cloud storage system 301 and the cloud compute system 303 connected to each other through the PCIe fabric. The cloud storage system 301 includes the computer memory 323, and the cloud compute system 303 includes the computer memory 337. The PCIe fabric includes the PCIe switch 305 connected to a PCIe interface of the cloud storage system 301 and to a PCIe interface of the cloud compute system 303. The method includes an operation 1403 in which the cloud compute system 303 operates to generate a command buffer for a data read operation. The method also includes an operation 1405 in which the cloud compute system 303 operates to write the command buffer to the computer memory 337 of the cloud compute system 303. The method also includes an operation 1407 in which the cloud compute system 303 operates to notify the cloud storage system 301 through the PCIe fabric that the command buffer has been written to the computer memory 337 of the cloud compute system 303. In some embodiments, the operation 1407 includes operating the cloud compute system 303 to write to a doorbell register that is exposed through the PCIe switch 305, with the doorbell register being monitored by the cloud storage system 301.

The method also includes an operation 1409 in which the cloud storage system 301 operates to read the command buffer through the PCIe fabric from the computer memory 337 of the cloud compute system 303. The method includes an operation 1411 in which the cloud storage system 301 operates to process the command buffer to read requested data from a storage device accessible by cloud storage system 301 and write the requested data in the computer memory 323 of the cloud storage system 301.

The method includes an operation 1413 in which the cloud storage system 301 operates to notify the cloud compute system 303 through the PCIe fabric that the requested data is in the computer memory 323 of the cloud storage system 301. In some embodiments, the operation 1413 includes operating the cloud storage system 301 to write to a doorbell register that is exposed through the PCIe switch 305, with the doorbell register being monitored by the cloud compute system 303. The method includes an operation 1415 in which the cloud compute system 303 operates to read the requested data through the PCIe fabric from the computer memory 323 of the cloud storage system 301.

In some embodiments of the method of FIG. 14, the PCIe switch 305 includes the NTB 321, and the PCIe interface of the cloud compute system 303 is connected to the PCIe switch 305 through the NTB 321. In some embodiments of the method of FIG. 14, the cloud storage system 301 includes the IOMMU 381, and the PCIe interface of the cloud storage system 301 is connected to the IOMMU 381. In some embodiments of the method of FIG. 14, the PCIe switch 305 includes the NTB 321, and the cloud storage system 301 includes the IOMMU 381, with the PCIe interface of the cloud compute system 303 connected to the PCIe switch 305 through the NTB 321, and with the PCIe interface of the cloud storage system 301 connected to the IOMMU 381.

FIG. 15 shows a method for using a doorbell register exposed through a PCIe fabric to request and transfer data between the cloud storage system 301 and the cloud compute system 303 in the cloud gaming system, in accordance with some embodiments. The method includes an operation 1501 for having a cloud gaming system that includes the cloud storage system 301 having a PCIe interface, where the cloud storage system 301 includes the computer memory 323. The cloud gaming system includes the PCIe switch 305 connected to the PCIe interface of the cloud storage system 301. The cloud gaming system also includes the cloud compute system 303 having a PCIe interface connected to the PCIe switch 305. In some embodiments, the PCIe switch 305 exposes one or more doorbell registers. The method includes an operation 1503 for operating the cloud compute system 303 to write to a doorbell register exposed through the PCIe switch 305. In response to the cloud compute system 303 writing to the doorbell register, the method proceeds with an operation 1505 for firing an interrupt on the cloud storage system 301. The method includes an operation 1507 in which the cloud storage system 301 is operated to handle the interrupt. The interrupt directs the cloud storage system 301 to read a message from a specified location in the computer memory 323 of the cloud storage system 301, where the message directs the cloud storage system 301 to read requested data from a storage device accessible by the cloud storage system 301.

In some embodiments, the method of FIG. 15 further includes operating the cloud storage system 301 to write the requested data into the computer memory 323 of the cloud storage system 301. In these embodiments, the method also includes notifying the cloud compute system 303 of a memory address at which the requested data is stored in the computer memory 323 of the cloud storage system 301. In some embodiments, notifying the cloud compute system 303 of the memory address includes writing to a doorbell register. In some embodiments, the method also includes operating the cloud compute system 303 to read the requested data from the computer memory 323 of the cloud storage system 301.

In some embodiments, the method of FIG. 15 includes operating the cloud storage system 301 to write the requested data into the computer memory 337 of the cloud compute system 303. In some embodiments, the cloud compute system 301 has a client memory map that holds memory addresses assigned to components of the cloud compute system 301. In these embodiments, the PCIe switch 305 is configured to translate the memory addresses held in the client memory map to memory addresses in the computer memory 323 of the cloud storage system 301, such that access to a given memory address in the client memory map is translated by the PCIe switch 305 to instead access a given memory address in the computer memory 323 of the cloud storage system 301.

The cloud compute system 303 includes firmware to start its hardware. This firmware may have code to boot from a local storage device, over a network, or over a PCIe fabric. In the case of the cloud compute system 303 booting over a network, the firmware of the cloud compute system 303 may issue a Dynamic Host Configuration Protocol (DHCP) request to request an Internet Protocol (IP) address and information about a storage server, such as the cloud storage system 301. The information about the cloud storage system 301 can include an IP address and a file system path to locate data, but may also include PCIe information. The PCIe information can include a memory address, PCIe bus/device/function information, or other information that allows the cloud compute system 303 to locate the cloud storage system 301 on which its data is stored. In some embodiments, information to support booting of the cloud compute system 303 is preloaded into the firmware of the cloud compute system 303, such as at the factory or by way of another mechanism, e.g., UART connection, among others. In the case where the cloud compute system 303 uses the PCIe fabric for data access to boot information, the data access may happen through the storage CPU 331 for which the corresponding data access code was part of the firmware of the cloud compute system 303. Also, the cloud storage system 301 may preload startup data that is required by the cloud compute system 303 in the memory that is accessible through the PCIe fabric, or may load the startup data on demand into the memory that is accessible through the PCIe fabric.

When a user starts a cloud gaming application, as part of the game startup process, the cloud gaming system may perform DRM related checks to validate the user's license to the game as being current and to obtain optional decryption keys as needed to decrypt game data. Upon validation of the user's license to the game, the cloud gaming system operates to mount the game data, particularly when the game data is stored in a special game package format. In the cloud gaming use case, mounting may trigger operations on the cloud storage system 301. For example, if the cloud storage system 301 does not have a copy of the game on its local storage device(s), e.g., computer memory 323, NVMe SSD 371, or other local storage such as HDD, the cloud storage system 301 may need to download the game to its local storage device(s). Once the cloud storage system 301 has identified the game content, the cloud storage system 301 may transfer all or part of the game content to fast storage, e.g., transfer game content from HDD to computer memory, or transfer game content from HDD to SSD to computer memory. Because many users are likely to play the same game, the cloud storage server 301 may skip downloading of the game and transfer of game content to fast storage when it is determined that the game content is already present in an appropriate location on the cloud storage system 301. For example, in some embodiments, the cloud storage system 301 may use a database to track a list of games that it has currently loaded and the locations in memory at which the corresponding game data is loaded. In some embodiments, a cloud service module that is outside of the cloud storage server 301 may have already ensured that a given user is assigned to the cloud storage server 301, where the cloud storage server 301 already has the game content loaded that is requested by the given user. To facilitate this embodiment, the cloud storage server 301 can provide metrics and/or other metadata to the cloud service module. It should be understood and appreciated that loading of game content from a cloud storage system 301 that already has the game content in local storage is likely best from a user experience viewpoint, as the user's game load time is reduced.

When the cloud compute system 303 sends a read command buffer to the cloud storage system 301, the cloud storage system 301 has options on how to obtain the requested data. In some cases, the cloud storage system 301 may have preloaded all the requested data into the computer memory 323 during the mount operation. If this is the case, the cloud storage system 301 just needs to translate the offset and length of the data requested by the command buffer to that of the computer memory 323 in the cloud storage system 301. In some cases, the offset in the command buffer might be relative to the storage location of the game package. If so, the cloud storage system 301 needs to add this offset to the storage location of the start of the game package. In some cases, the game package may be stored across multiple memory regions, such as when there is not enough consecutive memory space for the full package. In these cases, the cloud storage system 301 needs to add the offset to the address of the section of memory containing the request file. If multiple memory regions are involved, the cloud storage system 301 may return multiple memory areas. When the IOMMU 381 is implemented in the cloud storage system 301, the details of the multiple memory areas will be hidden from the cloud compute system 303, assuming that the cloud compute system 303 is responsible for reading the requested data from the cloud storage system 301.

In some cases, the cloud storage system 301 may not have loaded all of the game data into local storage during mounting of the game. For example, the cloud storage system 301 may have just loaded the file system table and other data structures into the computer memory 323 of the cloud storage system 301. When the cloud storage system 301 receive a command buffer that requests data that is not currently in the computer memory 323, the cloud storage system 301 operates to retrieve the requested data based on the command buffer. For example, in a block storage setup, one approach is for the cloud storage system 301 to retrieve requested data based on an offset parameter and a length parameter, and then cache the retrieved data in computer memory 323 for future access. Caching of data in computer memory 323 bypasses the need to retrieve the data from a slower storage device, such as HDD or SSD, and increase performance of the cloud storage system 301. In some cases, it may be difficult to predict what other data the gaming application will need to access. In such cases, cache misses may occur frequently. Therefore, in such cases, data stored after the memory block that was just accessed is also cached in the computer memory 323 in a predictive manner, although the gaming application may not use the predictively cached data.

In some embodiments, a gaming application has a specialized game file system with a file system table, such as previously discussed with regard to FIG. 10. The file system in this case is quite "flat" and can be considered like a key-value store, with each file being identified by an file identifier. In this case, the cloud storage system 301 has more information about an input/output request that just the data location. More specifically, in this case, the cloud storage system 301 knows what data belongs to a given file. Therefore, instead of the cloud storage system 301 operating to perform caching based on memory blocks, in this case the cloud storage system 301 can perform more intelligent caching of data based on a file level. For example, the cloud storage system 301 can pre-cache complete files from start-to-end based on a data request to that file. Also, the cloud storage system 301 can pre-cache portions of files as appropriate. In the key-value approach, a caching layer implemented by the cloud storage system 301 can operate to maintain a set of cache metadata that includes one or more counters, time stamps, and other information about the data that is cached into the computer memory 323, such as how often or how recently each data file has been accessed. In some embodiments, the caching layer implemented by the cloud storage system 301 can use the cache metadata to evict data from computer memory 323 that has not been accessed within a specified amount of time or that has not been accessed frequently enough.

In some cases, data access can be for user-specific data, which may be located on an HDD that is accessible either locally by the cloud storage system 301 or through a network (Internet) that is accessible by the cloud storage system 301. The POSIX API's may map through command buffers, which trigger data access to such user-specific data. To improve cloud gaming performance, the cloud storage system 301 can be operated to pre-fetch this user-specific data from a particular data storage device and save any modified version of the user-specific data back to the particular data storage device. Pre-fetching of the user-specific data can require deep interaction with the hardware of the cloud compute system 303, software, and possibly multiple servers.

The embodiments and method discussed above with regard to FIGS. 11 through 15 involve a client/server relationship in which a command buffer specifying an input/output data request is conveyed from the cloud compute system 303 (client) to the cloud storage system 301 (server). In these embodiments, the CPU 365 on the cloud storage system 301 is involved in some capacity in processing of the command buffer and may possibly be involved in the exchange of requested data between the cloud storage system 301 and the cloud compute system 303.

In some embodiments, processing of a command buffer and exchange of requested data can be performed by the cloud storage system 301 with bypassing of the CPU 365 of the cloud storage system 301. For example, in some embodiments, the CPU 365 of the cloud storage system 301 can include one or more CPU cores, memory controller(s), PCIe root complex(es), and other components. Offloading of the CPU 365 of the cloud storage system 301 refers to bypassing of the CPU core(s) of the CPU 365 for any software level processing. When the CPU 365 is offloaded, other non-CPU-core components (such as a memory controller, a DMA engine, or other component) within the CPU 365 can still be leveraged to enable processing of a command buffer and exchanging of requested data. One benefit of bypassing the CPU 365 when processing of a command buffer and exchanging of requested data is to avoid interrupting the CPU-cores within the CPU 365 and thereby improve performance of the cloud storage system 301. It should be understood and appreciated that processing by the CPU-core(s) within the CPU 365 adds extra overhead and results in more latency. The CPU core(s) within the CPU 365 are also expensive and consume power, so there is a cost and energy savings associated with offloading of the CPU 365.

In some embodiments, the CPU 365 of the cloud storage system 301 can be offloaded by having the cloud compute system 303 DMA data directly from the cloud storage system 301. In these embodiments, a file identifier table is used by the cloud compute system 303 to locate data on the local storage of the cloud storage system 301. In some embodiments, during a mount operation for a game application, the cloud storage system 301 generates a custom file identifier table that includes memory addresses in the computer memory 323 of the cloud storage system 301 for data listed in the game package of the mounted game application. The cloud storage server 301 makes the file identifier table for the game application available to the cloud compute system 303. The cloud compute system 303 can then use the file identifier table to determine memory addresses within the computer memory 323 of the cloud storage system 301 at which particular required data is located, and perform a corresponding DMA operation to read the required data directly from the computer memory 323 of the cloud storage system 301 without having to interrupt the CPU core(s) of the CPU 365 of the cloud storage system 301. Also, in this approach, the cloud compute system 303 does not need to transfer input/output command buffers to the cloud storage system 301. This approach for using the file identifier table and DMA operations on the cloud compute system 303 is particularly well suited for accessing read-only data (such as game packages, among other types of data) that is stored in the cloud storage system 301. Also, this approach for using the file identifier table and DMA operations on the cloud compute system 303 is likely to achieve a high level of data access performance because it does not require processing of each command buffer by the cloud storage server 301.

Figure 16:
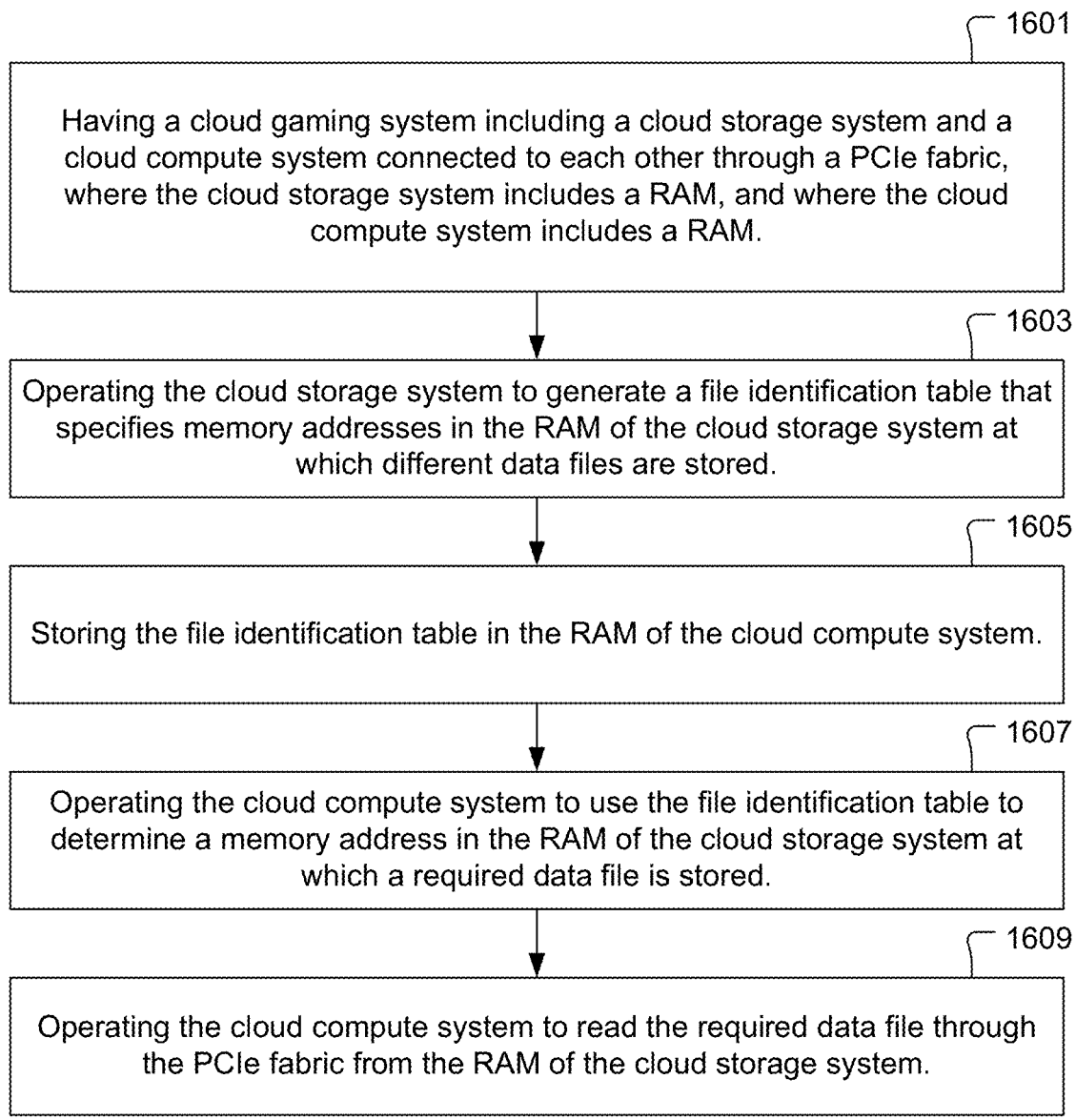
FIG. 16 shows a method for data transfer in a cloud gaming system, in accordance with some embodiments.

FIG. 16 shows a method for data transfer in a cloud gaming system, in accordance with some embodiments. The method includes an operation 1601 for having a cloud gaming system that includes the cloud storage system 301 and the cloud compute system 303 connected to each other through the PCIe fabric. The cloud gaming system includes the PCIe switch 305 connected to the PCIe interface of the cloud storage system 301. The cloud gaming system also includes the PCIe switch 305 connected to the PCIe interface of the cloud compute system 303. The cloud storage system 301 includes the computer memory 323. And, the cloud compute system 303 includes the computer memory 337. The method includes an operation 1603 in which the cloud storage system 301 operates to generate a file identification table that specifies memory addresses in the computer memory 323 of the cloud storage system 301 at which different data files are stored. In some embodiments, the operation 1603 is done during mounting of a game package, where the different data files are data files of the game package.

The method also includes an operation 1605 for storing the file identification table in the computer memory 337 of the cloud compute system 303. In some embodiments, the operation 1605 includes operating the cloud storage system 301 to notify the cloud compute system 303 through the PCIe fabric that the file identification table is available in the computer memory 323 of the cloud storage system 301, and where the file identification table is stored in the computer memory 323 of the cloud storage system 301. Also, the operation 1605 can include operating the cloud compute system 303 to read the file identification table through the PCIe fabric from the computer memory 323 of the cloud storage system 301. In some embodiments, operating the cloud storage system 301 to notify the cloud compute system 303 through the PCIe fabric that the file identification table is in the computer memory 323 of the cloud storage system 301 includes operating the cloud storage system 301 to write to a doorbell register that is exposed through the PCIe switch 305 to which both the cloud storage system 301 and the cloud compute system 303 are connected. The method also includes an operation 1607 in which the cloud compute system 303 operates to use the file identification table to determine a memory address in the computer memory 323 of the cloud storage system 301 at which a required data file is stored. The method also includes an operation 1609 in which the cloud compute system 303 operates to read the required data file through the PCIe fabric from the computer memory 323 of the cloud storage system 301.

In some embodiments of the method of FIG. 16, the PCIe switch 305 includes the NTB 321, and the PCIe interface of the cloud compute system 303 is connected to the PCIe switch 305 through the NTB 321. In some embodiments of the method of FIG. 16, the cloud storage system 301 includes the IOMMU 381, and the PCIe interface of the cloud storage system 301 is connected to the IOMMU 381. In some embodiments of the method of FIG. 16, the PCIe switch 305 includes the NTB 321, and the cloud storage system 301 includes the IOMMU 381, with the PCIe interface of the cloud compute system 303 connected to the PCIe switch 305 through the NTB 321, and with the PCIe interface of the cloud storage system 301 connected to the IOMMU 381.

Although some method operations have been described in a specific order herein, it should be understood that other housekeeping operations may be performed between operations, or operations may be adjusted so that they occur at slightly different times, or may be distributed in a system which allows the occurrence of the processing operations at various intervals associated with the processing. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various components utilized with the invention can be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method for requesting and transferring data in a cloud gaming system, comprising:
    having a cloud gaming system including a cloud storage system and a cloud compute system connected to each other through a peripheral component interconnect express (PCIe) fabric, the cloud storage system including a computer memory, the cloud compute system including a computer memory, wherein the cloud compute system has a client memory map that holds memory addresses assigned to components of the cloud compute system, the PCIe switch configured to translate the memory addresses held in the client memory map to memory addresses in the computer memory of the cloud storage system, such that access to a given memory address in the client memory map is translated by the PCIe switch to instead access a given memory address in the computer memory of the cloud storage system;
    operating the cloud compute system to generate a command buffer for a data read operation;
    operating the cloud compute system to write the command buffer to the computer memory of the cloud compute system;
    operating the cloud compute system to notify the cloud storage system through the PCIe fabric that the command buffer has been written to the computer memory of the cloud compute system;
    operating the cloud storage system to read the command buffer through the PCIe fabric from the computer memory of the cloud compute system;
    operating the cloud storage system to process the command buffer to read requested data from a storage device accessible by cloud storage system;
    operating the cloud storage system to write the requested data through the PCIe fabric to the computer memory of the cloud compute system;
    operating the cloud storage system to notify the cloud compute system through the PCIe fabric that the requested data is in the computer memory of the cloud compute system; and
    operating the cloud compute system to read the requested data from the computer memory of the cloud compute system.

2. The method as recited in claim 1, wherein the PCIe fabric includes a PCIe switch connected to a PCIe interface of the cloud storage system and to a PCIe interface of the cloud compute system.

3. The method as recited in claim 2, wherein operating the cloud compute system to notify the cloud storage system that the command buffer has been written to the computer memory of the cloud compute system includes operating the cloud compute system to write to a doorbell register exposed through the PCIe switch.

4. The method as recited in claim 3, wherein writing to the doorbell register causes an interrupt to fire on the cloud storage system, which in turn causes the cloud storage system to handle the interrupt which directs the cloud storage system to read a message from a specified computer memory location, the message directing the cloud storage system to read the command buffer from the computer memory of the cloud compute system.

5. The method as recited in claim 4, wherein the specified computer memory location is in the computer memory of the cloud storage system.

6. The method as recited in claim 4, wherein the specified computer memory location is in the computer memory of the cloud compute system.

7. The method as recited in claim 2, wherein operating the cloud storage system to notify the cloud compute system that the requested data is in the computer memory of the cloud compute system includes operating the cloud storage system to write to a doorbell register exposed through the PCIe switch.

8. The method as recited in claim 7, wherein writing to the doorbell register causes an interrupt to fire on the cloud compute system, which in turn causes the cloud compute system to handle the interrupt which directs the cloud compute system to read a message from a specified computer memory location, the message notifying the cloud compute system of where the requested data is stored in the computer memory of the cloud compute system.

9. The method as recited in claim 8, wherein the specified computer memory location is in the computer memory of the cloud storage system.

10. The method as recited in claim 8, wherein the specified computer memory location is in the computer memory of the cloud compute system.

11. The method as recited in claim 2, wherein the PCIe switch includes a PCIe non-transparent bridge (NTB) and the PCIe interface of the cloud compute system is connected to the PCIe switch through the PCIe NTB, or
wherein the cloud storage system includes an input/output memory management unit (IOMMU) and the PCIe interface of the cloud storage system is connected to the IOMMU, or
wherein the PCIe switch includes the PCIe NTB and the PCIe interface of the cloud compute system is connected to the PCIe switch through the PCIe NTB, and the cloud storage system includes the IOMMU and the PCIe interface of the cloud storage system is connected to the IOMMU.

12. A method for requesting and transferring data in a cloud gaming system, comprising:
having a cloud gaming system including a cloud storage system and a cloud compute system connected to each other through a peripheral component interconnect express (PCIe) fabric, the cloud storage system including a computer memory, the cloud compute system including a computer memory;
operating the cloud compute system to generate a command buffer for a data read operation;
operating the cloud compute system to write the command buffer to the computer memory of the cloud compute system;
operating the cloud compute system to notify the cloud storage system through the PCIe fabric that the command buffer has been written to the computer memory of the cloud compute system;
operating the cloud storage system to read the command buffer through the PCIe fabric from the computer memory of the cloud compute system;
operating the cloud storage system to process the command buffer to read requested data from a storage device accessible by cloud storage system and write the requested data in the computer memory of the cloud storage system;
operating the cloud storage system to notify the cloud compute system through the PCIe fabric that the requested data is in the computer memory of the cloud storage system; and
operating the cloud compute system to read the requested data through the PCIe fabric from the computer memory of the cloud storage system.

13. The method as recited in claim 12, wherein the PCIe fabric includes a PCIe switch connected to a PCIe interface of the cloud storage system and to a PCIe interface of the cloud compute system.

14. The method as recited in claim 13, wherein operating the cloud compute system to notify the cloud storage system that the command buffer has been written to the computer memory of the cloud compute system includes operating the cloud compute system to write to a doorbell register exposed through the PCIe switch.

15. The method as recited in claim 14, wherein writing to the doorbell register causes an interrupt to fire on the cloud storage system, which in turn causes the cloud storage system to handle the interrupt which directs the cloud storage system to read a message from a specified computer memory location, the message directing the cloud storage system to read the command buffer from the computer memory of the cloud compute system.

16. The method as recited in claim 15, wherein the specified computer memory location is in the computer memory of the cloud storage system.

17. The method as recited in claim 15, wherein the specified computer memory location is in the computer memory of the cloud compute system.

18. The method as recited in claim 13, wherein operating the cloud storage system to notify the cloud compute system that the requested data is in the computer memory of the cloud storage system includes operating the cloud storage system to write to a doorbell register exposed through the PCIe switch.

19. The method as recited in claim 18, wherein writing to the doorbell register causes an interrupt to fire on the cloud compute system, which in turn causes the cloud compute system to handle the interrupt which directs the cloud compute system to read a message from a specified computer memory location, the message notifying the cloud compute system of where the requested data is stored in the computer memory of the cloud storage system.

20. The method as recited in claim 19, wherein the specified computer memory location is in the computer memory of the cloud storage system.

21. The method as recited in claim 19, wherein the specified computer memory location is in the computer memory of the cloud compute system.

22. The method as recited in claim 13, wherein the PCIe switch includes a PCIe non-transparent bridge (NTB) and the PCIe interface of the cloud compute system is connected to the PCIe switch through the PCIe NTB, or
wherein the cloud storage system includes an input/output memory management unit (IOMMU) and the PCIe interface of the cloud storage system is connected to the IOMMU, or
wherein the PCIe switch includes the PCIe NTB and the PCIe interface of the cloud compute system is connected to the PCIe switch through the PCIe NTB, and the cloud storage system includes the IOMMU and the PCIe interface of the cloud storage system is connected to the IOMMU.

23. The method as recited in claim 13, wherein the cloud compute system has a client memory map that holds memory addresses assigned to components of the cloud compute system, the PCIe switch configured to translate the memory addresses held in the client memory map to memory addresses in the computer memory of the cloud storage system, such that access to a given memory address in the client memory map is translated by the PCIe switch to instead access a given memory address in the computer memory of the cloud storage system.

* * * * *